United States Patent
Raeder

(10) Patent No.: US 10,813,380 B2
(45) Date of Patent: Oct. 27, 2020

(54) METHOD AND DEVICE FOR PRODUCING A HOLLOW CYLINDRICAL, EDIBLE CONTAINER COMPOSED OF A VEGETABLE ITEM OR FRUIT ITEM

(71) Applicant: Raeder Capital GmbH, Munich (DE)

(72) Inventor: Niels Raeder, Tutzing (DE)

(73) Assignee: Raeder Capital GmbH, Munich (DE)

( * ) Notice: Subject to any disclaimer, the term of this patent is extended or adjusted under 35 U.S.C. 154(b) by 0 days.

(21) Appl. No.: 15/505,447

(22) PCT Filed: Aug. 21, 2015

(86) PCT No.: PCT/EP2015/069293
§ 371 (c)(1),
(2) Date: Feb. 21, 2017

(87) PCT Pub. No.: WO2016/026971
PCT Pub. Date: Feb. 25, 2016

(65) Prior Publication Data
US 2017/0332681 A1    Nov. 23, 2017

(30) Foreign Application Priority Data
Aug. 22, 2014  (DE) .................. 10 2014 112 083

(51) Int. Cl.
*A47J 25/00*  (2006.01)
*A23P 20/25*  (2016.01)
*A47J 17/16*  (2006.01)

(52) U.S. Cl.
CPC ............. *A23P 20/25* (2016.08); *A47J 17/16* (2013.01); *A47J 25/00* (2013.01)

(58) Field of Classification Search
CPC .................. A47J 25/00; A47J 17/16
(Continued)

(56) References Cited

U.S. PATENT DOCUMENTS 2,359,881 A * 10/1944 Serr ............... A22C 11/00
408/19
2,956,600 A * 10/1960 McDonald ......... A21C 15/04
408/125
(Continued)

FOREIGN PATENT DOCUMENTS

EP   1867236 A2   12/2007
EP   2050346 A1   4/2009
(Continued)

OTHER PUBLICATIONS

International Search Report from corresponding International Application No. PCT/EP2015/069293.
(Continued)

*Primary Examiner* — Reginald Alexander
(74) *Attorney, Agent, or Firm* — Jodi A. Reynolds, Esq.; Harter Secrest & Emery LLP

(57) ABSTRACT

A method and device for producing a hollow cylindrical, edible container composed of a vegetable item or fruit item (10), in particular of a cucumber, courgette or the like, which can be filled with a filling. The device has a centring means (11) for centring and fixing the fruit item (10), a hollowing-out means (21) for removing the core of the fruit item (10) and forming an internal cavity, and a peeling device for removing the outer shell of the fruit item (10).

25 Claims, 20 Drawing Sheets

(58) Field of Classification Search
USPC .................................. 99/542, 544, 559, 494
See application file for complete search history.

(56) References Cited

U.S. PATENT DOCUMENTS

| | | | |
|---|---|---|---|
| 3,382,900 A | | 5/1968 | deBack |
| 4,300,286 A | * | 11/1981 | Panchula ............. A22C 7/0007 30/113.3 |
| 4,640,187 A | * | 2/1987 | Wallick ................ A21C 15/007 408/68 |
| 4,718,333 A | * | 1/1988 | Pierce .................... A23N 7/002 99/486 |
| 4,741,265 A | * | 5/1988 | Cushman ............... A23N 7/002 99/542 |
| 7,096,777 B1 | * | 8/2006 | Healy ..................... A23N 4/20 99/542 |

FOREIGN PATENT DOCUMENTS

| | | |
|---|---|---|
| GB | 2258608 A | 2/1993 |
| JP | 2009-247325 A | 10/2009 |
| KR | 100792464 B1 | 1/2008 |
| WO | 03/043443 A | 5/2003 |

OTHER PUBLICATIONS

The Recession Kitchen . . . and Garden. "Mock Tuna Stuffed Cucumbers." Accessed using the Wayback Machine, dated Sep. 13, 2009, and cited in corresponding DE Application No. 102014112083.3.

* cited by examiner

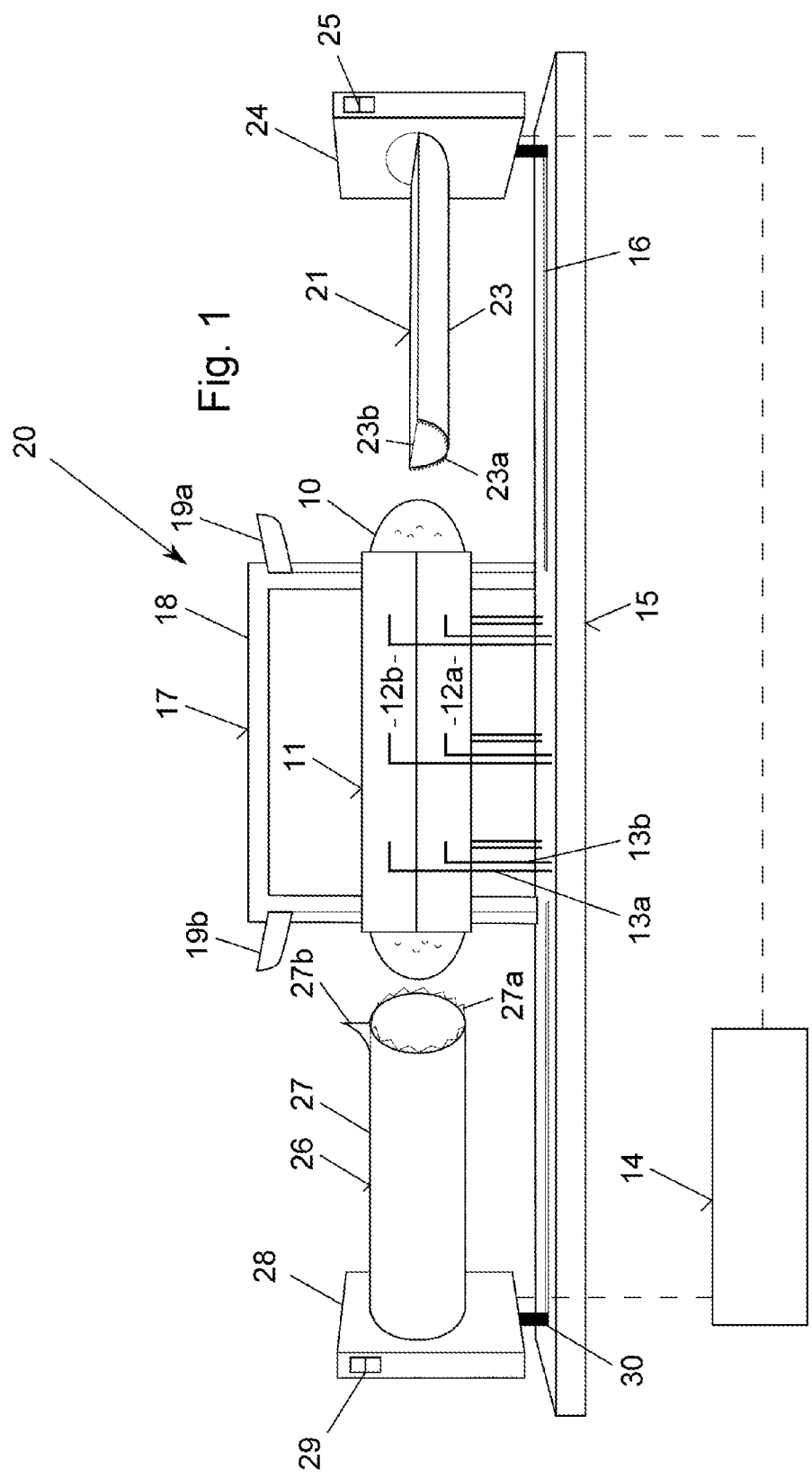

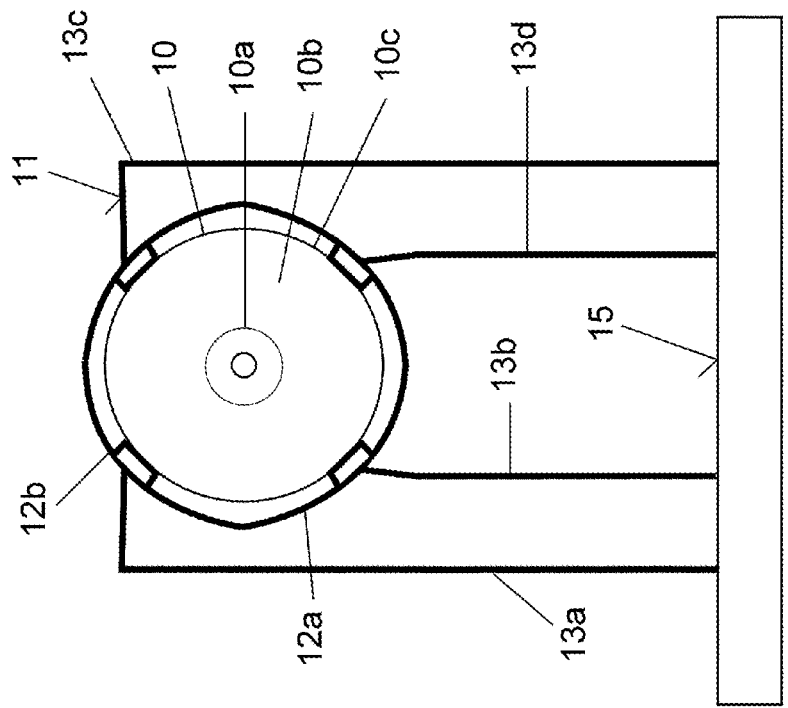
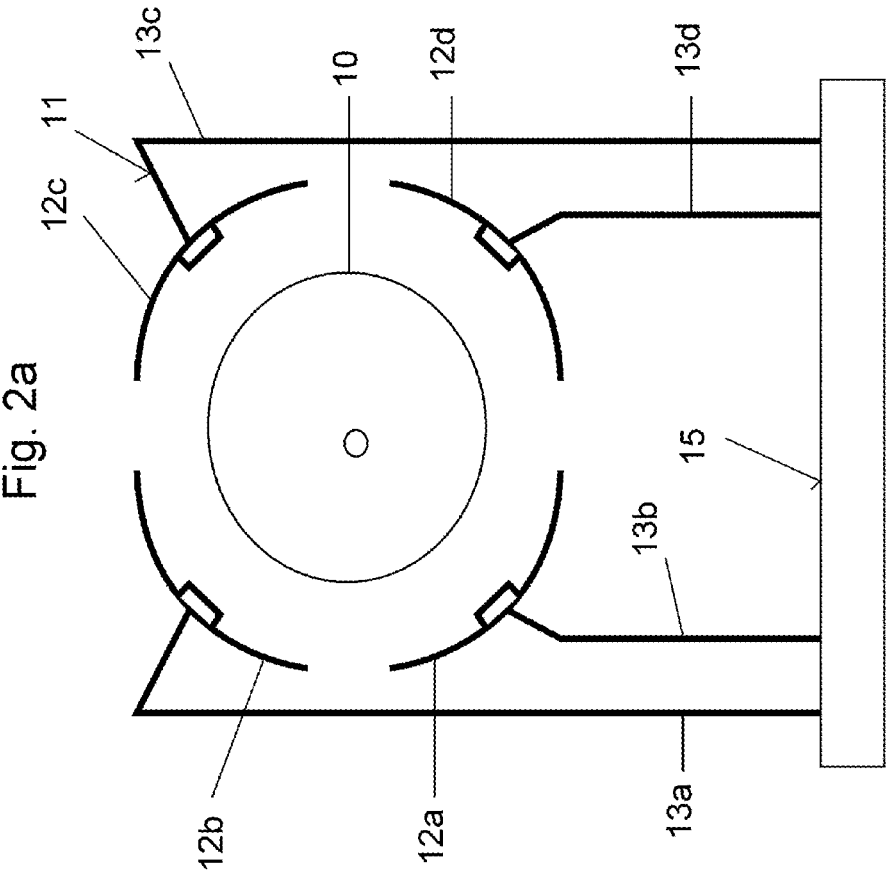

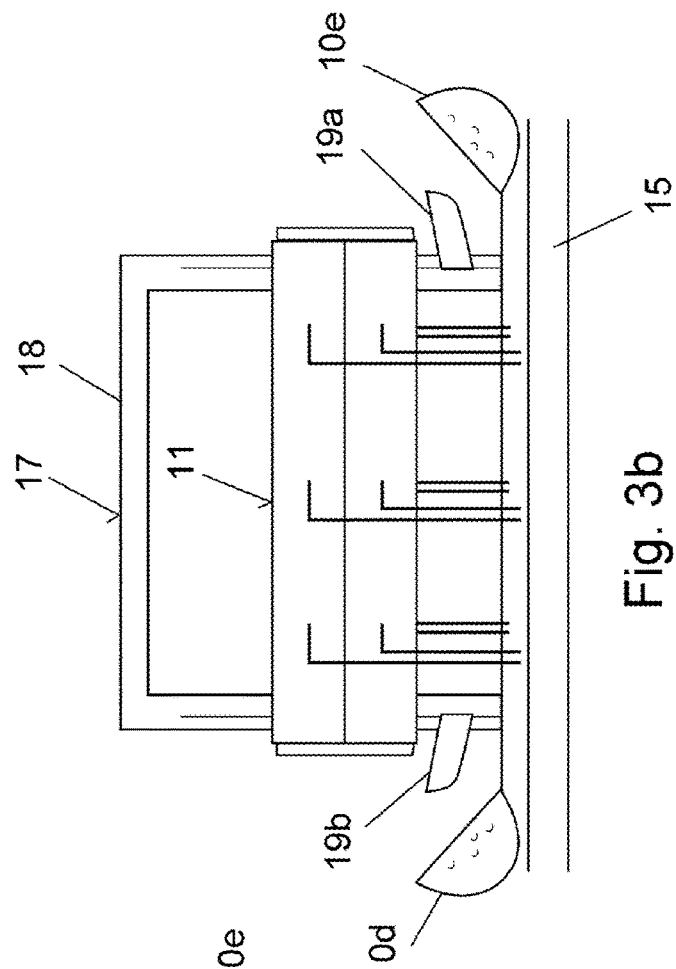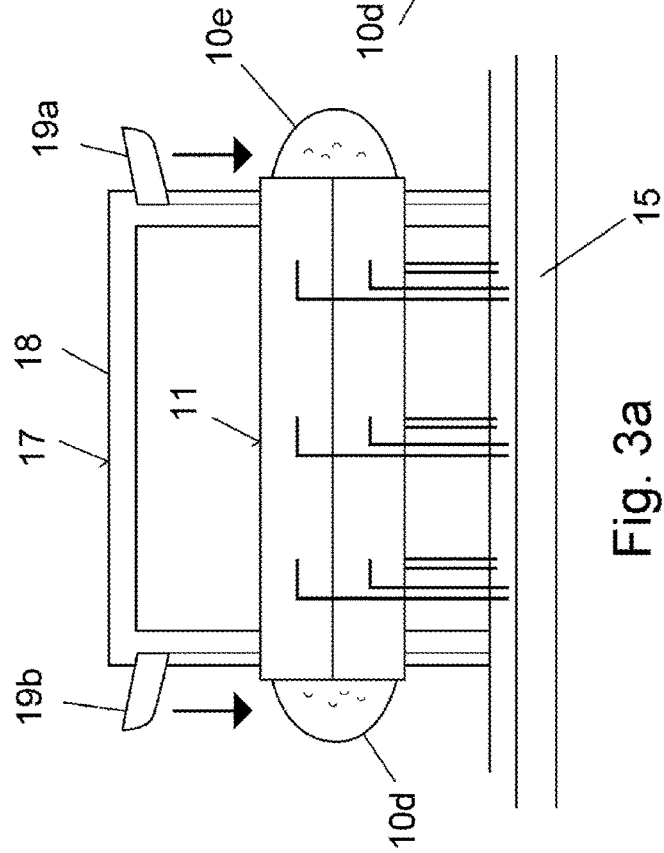

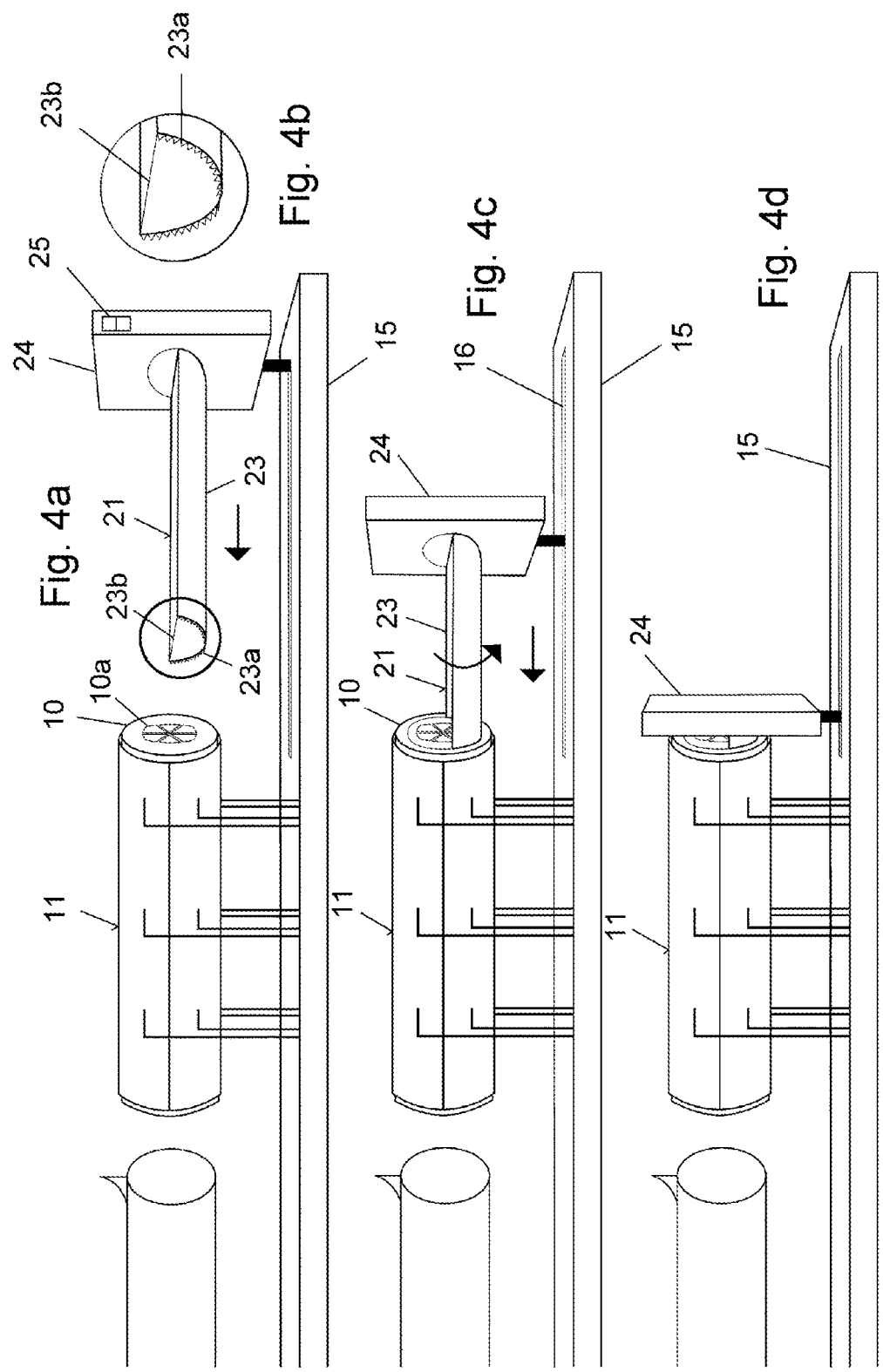

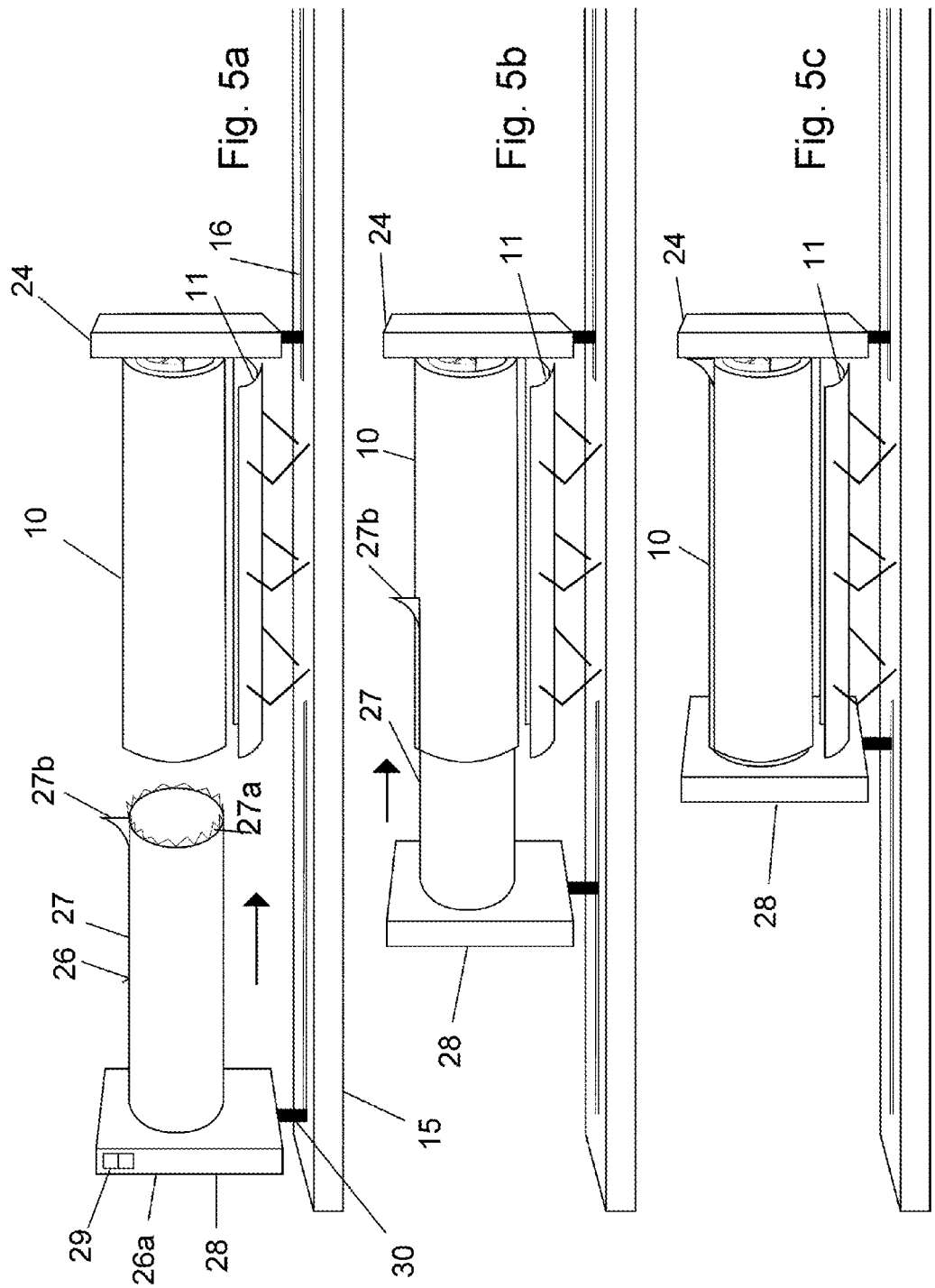

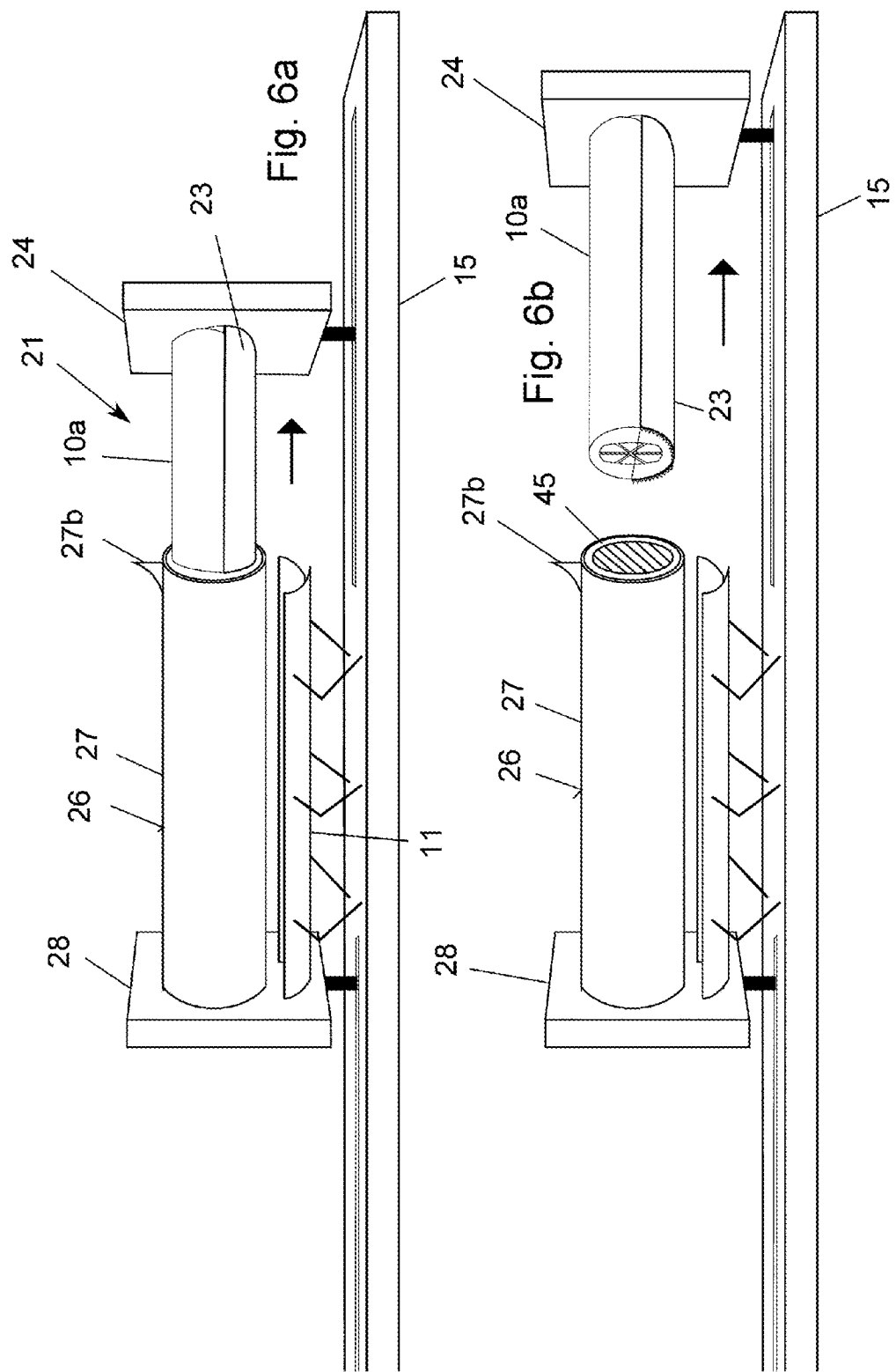

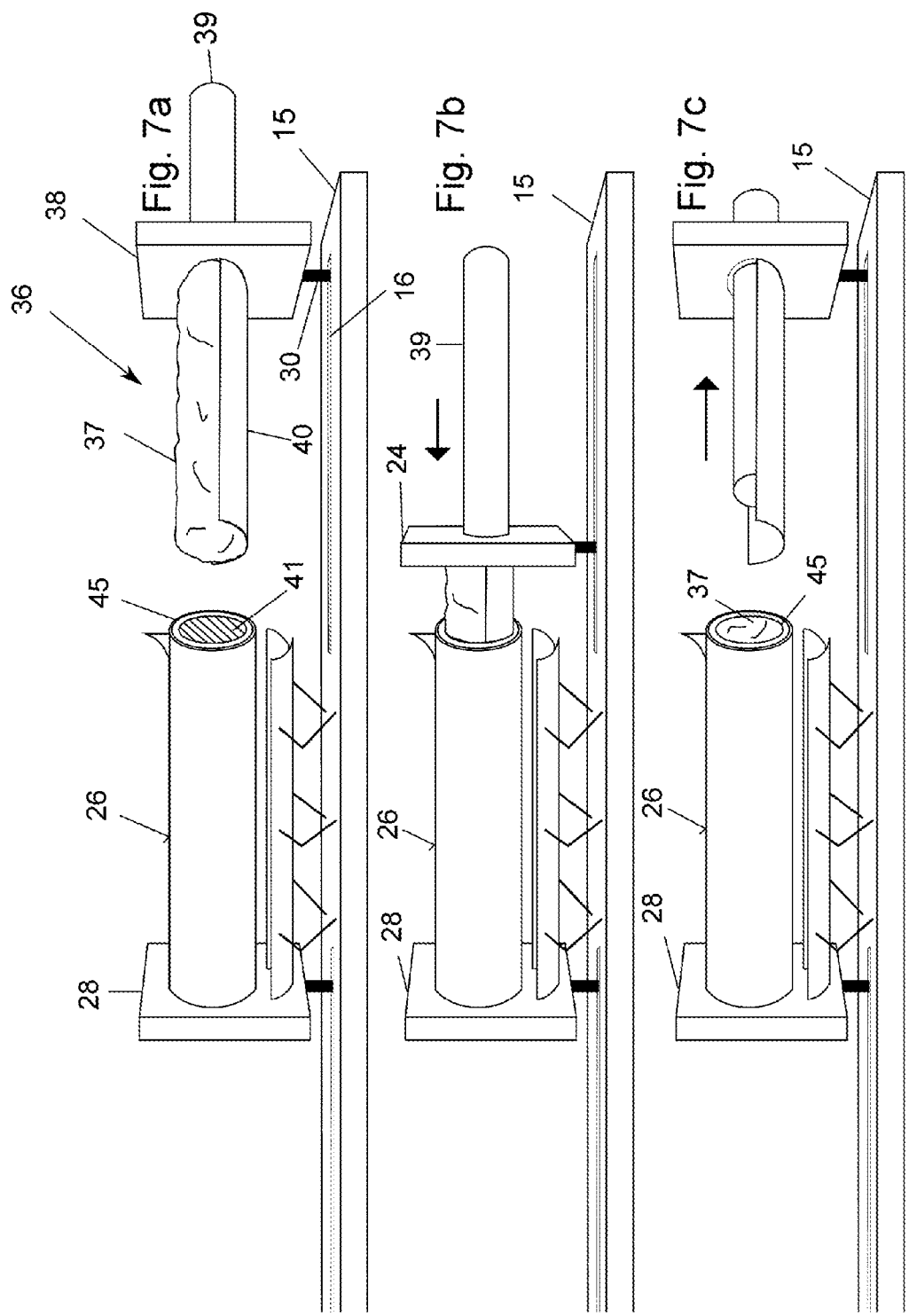

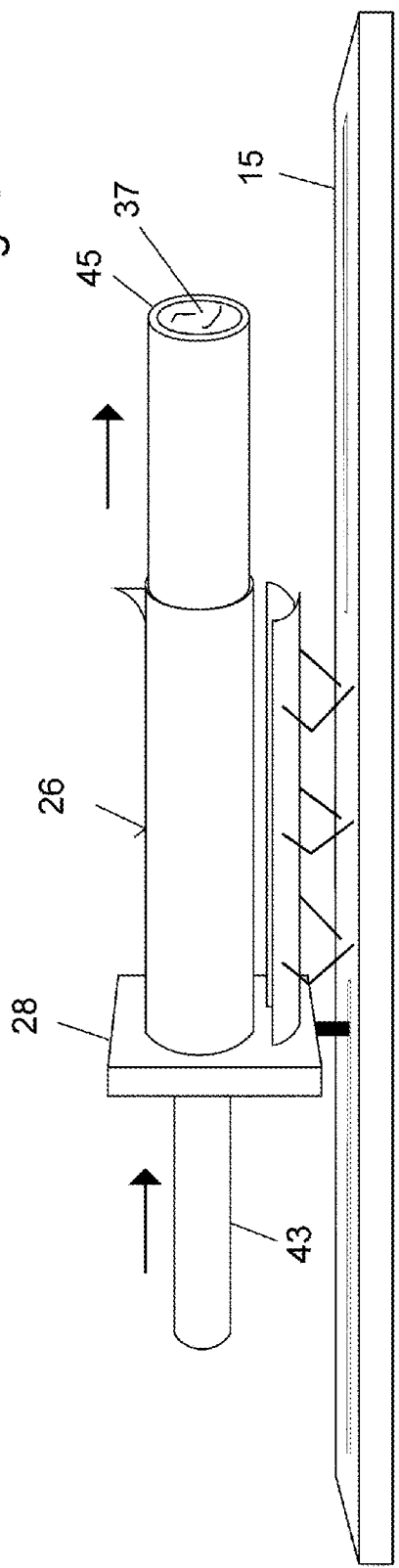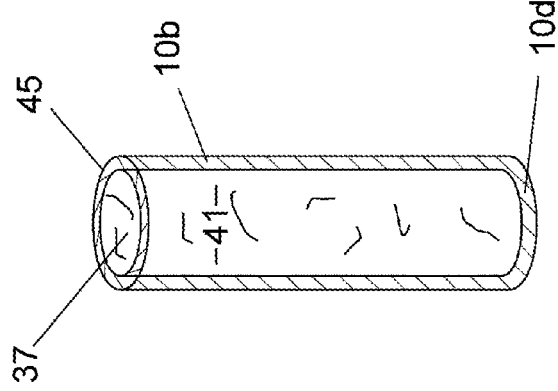

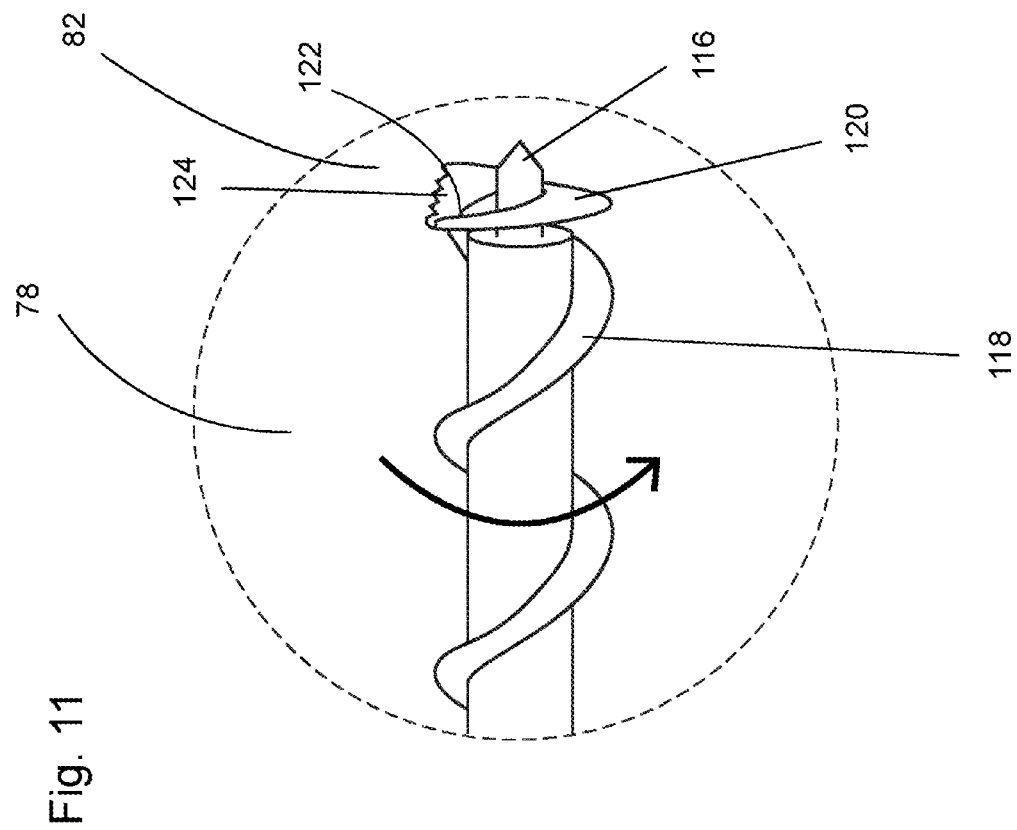

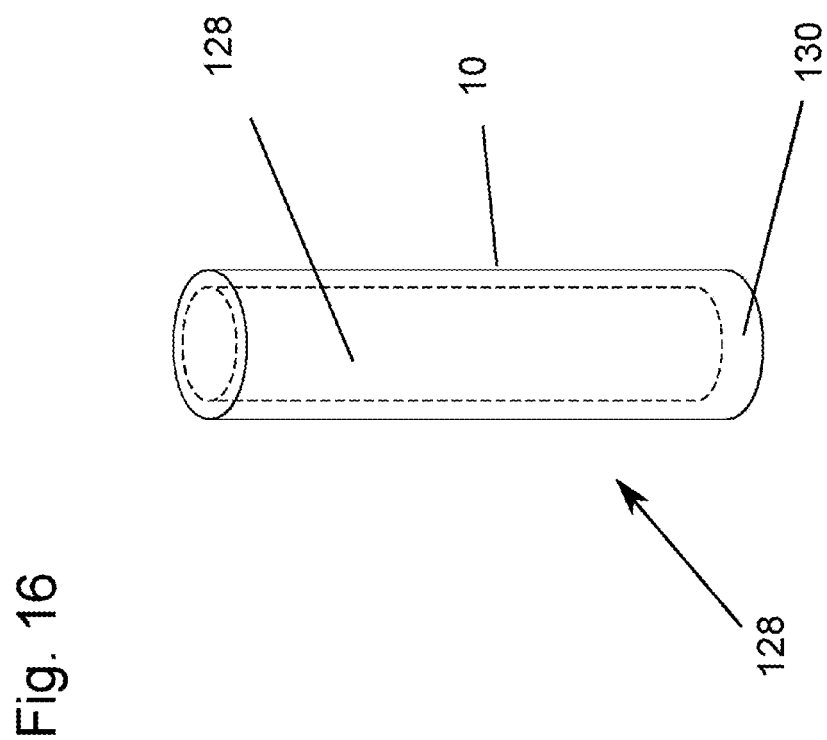

METHOD AND DEVICE FOR PRODUCING A HOLLOW CYLINDRICAL, EDIBLE CONTAINER COMPOSED OF A VEGETABLE ITEM OR FRUIT ITEM

TECHNICAL FIELD

The invention concerns a method for producing a hollow cylindrical edible container composed of a vegetable item or a fruit item, especially a cucumber, zucchini, or the like, which can be filled with a filling, a container produced according to the method, as well as an apparatus to carry out the method.

BACKGROUND OF THE INVENTION

Edible containers for filling with an edible filling, such as a meat filling, are known in many varieties. Thus, buns which are filled with meat or vegetables are used to make hamburgers and doner kebabs. So-called hot dogs are also known for which a bun is provided with a hole into which a sausage is placed. Due to gluten intolerance, many people have problems with buns made from grains. Furthermore, many people are interested in food having few carbohydrates. For this reason, they would rather not consume grain products.

U.S. Pat. No. 3,382,900 A discloses the industrial processing of a pineapple. In this process, the fruit is clamped, the end portions are cut off, the core is hollowed out, and the outer shells are removed. An apparatus with a centering device, a cutting device, a de-coring device and with peeling heads is used for this. As the end product, one then obtains the familiar ring-shaped piece of pineapple.

U.S. Pat. No. 7,096,777 B1 discloses a similar production method and a similar apparatus to U.S. Pat. No. 3,382,900 A and also furthermore shows a control system for the apparatus.

KR 10 0 792 464 B1 discloses a production method for producing filled cucumber disks with the aid of a receiving device and hollow knives designed for this. The receiving device for the cucumber consists of two half-shells which can be joined together and which clamp the cucumber in place. After this, the end regions of the fruit protruding beyond the half-shells are cut off with a knife and the core is hollowed out completely with the aid of the hollow knife. In this way, one obtains a tubular cucumber container. This is filled by hand and then either cut in half lengthways or sliced into disks for serving.

SUMMARY OF THE INVENTION

The problem which the present invention proposes to solve is to further modify an edible container.

As the solution of this problem, a method according to claim 1 is proposed and an apparatus according to claim 12 for producing a hollow cylindrical edible container composed of a vegetable item or a fruit item, especially a cucumber, zucchini, or the like, which can be filled with a filling.

Since the container is made from a vegetable item or a fruit item, no problems occur with gluten intolerance. Furthermore, the edible container is suitable for holding the filling of a low-carbohydrate food. Since only a portion of the fruit is hollowed out from the container, it has a bottom which prevents the filling from falling out.

The method according to the invention can be used for various fruits and vegetables. But in particular it is suitable for cucumbers.

In the method according to the invention, at first a centering and a fixing of the fruit in a centering device are accomplished. Next, at least one end region of the fruit is separated. Then the core or a region of the core of the fruit is partly hollowed out to form an interior cavity with a bottom. Finally, an outer shell of the fruit is removed. Thanks to the centering of the fruit, a hollowing out is made possible and cutting scraps are minimized, especially in the case of a curved fruit.

The method according to the invention and the apparatus according to the invention enable an automatic processing of the starting piece of fruit.

The method according to the invention is preferably carried out with the apparatus according to the invention.

Advantageous embodiments of the method according to the invention are the subject matter of the dependent claims.

Advantageously, the interior cavity of the container is filled with a suitable filling. This involves in particular an organic filling such as chicken, beef, salmon, tuna, lettuce, rice or mixtures thereof.

The outside of the edible container can be processed. In particular, a granular coating can be applied to the outside of the container, especially one of sesame seeds or coconut. In this way, one achieves a dry surface which enhances the secure holding of the container.

In an advantageous embodiment, the centering device for the centering of the fruit and fixing of the fruit on the outside switches from a position of rest to a centering position. The centering device consists for example of several spaced-apart holding elements, which form two half-shells that fix the fruit accordingly from a first side and a second side. For example, the centering device is open in the position of rest, that is, the fruit can be placed in the centering device in the position of rest. In particular, the centering device is closed in the centering position, that is, the fruit is firmly fixed and centered in the centering position. In the centering position, the fruit is fixed for example in such a way that curvatures of the fruit can be balanced out and the fruit can be fixed as straight as possible in the centering device.

Advantageously, the centering device switches from a centering position to a peeling position. In the centering position, the fruit is centered and fixed in the centering device, at least one of the end regions of the fruit is separated and the core of the fruit is hollowed out to form an interior cavity, wherein the core is hollowed out only across a partial region of the fruit, so that a closed bottom of the fruit remains in place. The outer shell of the fruit is removed in the peeling position.

In an advantageous embodiment, the fruit is held in the peeling position by a holding device. The holding device, unlike the centering device, affords the advantage that the fruit can be held from the inside and thus the outer surface of the fruit is left free. Especially when the fruit is to be peeled, it is helpful to hold the fruit from the inside.

Advantageously, a hollow tube of the holding device is introduced into the cavity of the fruit in order to fix the fruit. By introducing the hollow tube into the interior cavity of the fruit, a holding of the fruit from only the inside of the fruit is made possible. Thus, the outside of the fruit remains free and can be processed. For example, the outer diameter of the hollow tube corresponds as much as possible to the outer diameter of the peeling device.

Since the diameter of the hollow tube corresponds roughly to the diameter of the cavity of the fruit, only a small space is formed between the hollow tube and the fruit when the hollow tube is inserted into the interior cavity of the fruit. Thanks to the liquid stored up in the fruit, moistening the inside of the fruit, the friction of the liquid at the inner surface of the fruit against the outer surface of the hollow tube prevents a twisting of the fruit on the hollow tube. The friction here is directly dependent on the contact surface between hollow tube and inside of the fruit. As long as the friction is larger than the force which the peeling device produces on the fruit when it is being peeled, an optimal operation is assured. For example, the hollow tube has the smoothest possible surface in order to maximize the contact surface between the hollow tube and the inside of the fruit and thus the friction force between the hollow tube and the fruit.

Thanks to the holding of the fruit on the inside with the aid of a hollow tube, it is furthermore possible for the peeling device to peel the fruit on the outside, which is not possible with a piece of fruit clamped in the centering device.

In an advantageous embodiment, the fruit is stripped off at a stripping-off device for removal from the holding device. For example, the stripping-off device comprises a stripping plate and a through opening in the stripping plate. For example, the diameter of the fruit is larger than the diameter of the hollow tube of the holding device. A movement of the hollow tube through a through opening of the stripping plate provided for this purpose with only a slightly larger diameter than the hollow tube ensures that the fruit, having a larger diameter than the opening of the stripping plate, is blocked by the stripping plate in the direction of movement of the hollow tube and thus is stripped off from the hollow tube at the stripping plate.

Advantageously, a leveling of the fruit along its entire length is accomplished during the centering and fixing of the fruit by the centering device. For example, the fruit is centered by each of the holding elements in the centering position. After this, the fruit is leveled by vertical displacement of the individual holding elements. Curvatures of the fruit are thus balanced out and the fruit can be fixed as straight as possible in the centering device. This results in a maximization of the fruit body which can be processed and a reduction in the amount of waste.

The apparatus according to the invention to carry out the method according to claim 12 comprises a centering device for the centering and fixing of the fruit, a hollowing-out device for the removing of the core of the fruit and formation of an interior cavity, and a peeling device for the removing of the outer shell of the fruit.

The mentioned devices can be manual in design or have a drive unit.

Advantageously, the centering device and/or the hollowing-out device and/or the peeling device can travel relative to each other. For example, the centering device and/or the hollowing-out device and/or the peeling device can travel relative to each other on one or more rails. In particular, it is possible for one or more of the devices to be fixed firmly, as long as at least one of the devices can travel. However, several of the devices or all of the devices can be able to travel. The traveling ability of the devices relative to each other facilitates an automatic performance of the method steps, for example, by a traveling with the aid of an electric motor.

In an advantageous embodiment, the hollowing-out device and/or the peeling device can comprise a hollow knife, which is coupled to a drive unit. Rotating hollow knives will be used here in particular, whose diameter is adapted to the fruit to be processed. Thus, the knives are designed to be interchangeable. The drive unit can be for example an electric motor, and it can drive both the rotation of the hollow knife and the horizontal travel of the hollowing-out device.

In an advantageous embodiment, the centering device can comprise at least two centering shells enclosing the fruit. One advantageous embodiment comprises four mutually adjustable centering shells, which are secured on associated holders.

Furthermore, the device can comprise a cutting device for the separating of an end region of the fruit.

Advantageously, the apparatus comprises a filling device for the placing of a filling in the interior cavity. The filling device can here comprise a shell-shaped carriage for holding the filling and a piston able to travel relative to it for the emptying of the carriage.

In an advantageous embodiment, a control device is provided, which controls an automatic feeding of the hollowing-out device and/or the peeling device and/or the filling device.

In an advantageous embodiment, the apparatus comprises a delivery unit in order to arrange the individual elements of the apparatus movably with respect to each other in one or more dimensions.

Advantageously, the delivery unit has delivery spindles for delivering the individual elements.

In an advantageous embodiment, the apparatus comprises a base body with a groove running in the longitudinal direction for introducing the centering device and/or the hollowing-out device and/or the peeling device and/or the filling device. Thus, the apparatus has a modular design, wherein the individual devices each comprise holders corresponding to the longitudinal groove, which can be secured on the base body. The electrical connection of the devices secured on the base body can also occur via the longitudinal groove.

In an advantageous embodiment, the centering device comprises a holding unit, by means of which the fruit can be fixed and centered.

Advantageously, the holding unit comprises several holding elements, which are staggered in the longitudinal direction.

In an advantageous embodiment, the holding elements form at least one first holding jaw and one second holding jaw, which can travel relative to each other. For example, the holding jaws can be moved away from each other or moved up to each other.

Advantageously, the holding jaws comprise a semicircular holding surface, in order to adapt to the fruit the best possible way.

Advantageously, the holding elements are outfitted with a pressure sensor. With the aid of the pressure sensor, one can assure the most gentle possible handling of the fruit. When the fruit is fixed by the centering device/holding unit, curvatures of the fruit are balanced out by bending and the fruit is leveled along its entire length. In this way, the curvatures of the fruit are balanced out the best possible way and the fruit is centered in the centering device without damaging the fruit in this way. With the aid of the pressure sensor, the fruit can be centered in the individual holding elements and then be leveled by a vertical displacement of the holding elements relative to each other in the same plane. Furthermore, the pressure sensor enables the most optimal possible orientation of the fruit, so that the body of the fruit used for the edible container obtained as the end product can be maximized for processing.

In an advantageous embodiment, the cutting device is designed for the cutting of a defined bottom in the cavity of the fruit. In particular, the bottom is defined by the shape of the cutting device, so that a concave, convex, or planar bottom is produced, for example.

Advantageously, the hollowing-out device is designed as a spiral drill, in which the cutting device for the cutting of a defined bottom is arranged at the end face. The hollowing-out device is designed to remove a core of the fruit and create an interior cavity in the fruit. Thus, the diameter of the spiral drill corresponds to the diameter of the interior cavity of the fruit. Furthermore, the hollowing-out device can have different diameters, depending on the fruit used, in order to make possible predefined interior cavities and thus predefined wall thicknesses of the hollowed-out fruit depending on the fruit used. The desired wall thickness of the hollowed-out fruit is determined according to the stability of the fruit as well as its length. With increasing length of the hollowed-out fruit, its stability decreases. Likewise, different fruits possess different properties in terms of their stability. Thanks to the above-described centering device with pressure sensors to maximize the fruit body to be processed and the variable hollowing-out device depending on the fruit, an especially thin wall with uniform wall thickness can be achieved, without endangering the stability of the hollowed-out fruit too much.

In an advantageous embodiment, the apparatus comprises a holding device for the fixing of the fruit. For example, the holding device can fix the fruit from the inside. Advantageously, the holding device comprises a hollow tube with a vent opening. The hollow tube comprises roughly the diameter of the interior cavity of the fruit and is suited to enter into the interior cavity of the fruit in order to hold the fruit from the inside.

Since the stability of a hollowed-out fruit is usually very low, the vent opening prevents a damaging of the fruit. In this way, no pressure differences between the inside of the fruit and the surroundings occur during the processing of the fruit.

In an advantageous embodiment, the hollow tube comprises a smooth surface. A smoothest possible surface affords an especially large contact surface of the hollow tube with the inside of the fruit and it is proportional to the magnitude of the friction force between fruit and hollow tube. If the contact friction between fruit and hollow tube is too slight, the fruit can twist on the hollow tube when the peeling device tries to peel the fruit from the outside. Therefore, one must make sure to maximize the contact friction.

Advantageously, the peeling device comprises a stripping device for the stripping of the fruit off from the hollow tube.

In an advantageous embodiment, the peeling device comprises a horizontally movable peeling knife. For example, the peeling knife is designed to separate end regions of the fruit from the fruit.

Advantageously, the stripping device comprises a stripping plate with a through opening for the stripping of the fruit off from the hollow tube. In order to remove the fruit from the hollow tube once more after the peeling process, the hollow tube is led through a through opening of the stripping device. The fruit fixed on the hollow tube by contact friction does not fit through this through opening and is thus stripped off from the hollow tube at the stripping plate.

In an advantageous embodiment, the centering device and the peeling device are fastened on the base body and are able to jointly travel vertically in order to switch from a centering position to a peeling position. In the centering position, the hollowing-out device has access to the fruit being processed by a horizontal movement, while in the peeling position the holding device has access to the fruit to be processed by a horizontal movement.

Advantageously, the holding device and the hollowing-out device are fastened on the base body and are able to jointly travel horizontally.

The mentioned devices can be manual in design or have a drive unit.

Advantageously, the apparatus comprises a cleaning device for the cleaning of the hollowing-out device and/or the peeling device and/or the holding device. The cleaning device for example has cleaning nozzles, which clean the spiral drill of the hollowing-out device upon emerging from the fruit, the hollow tube of the holding device upon emerging from the fruit, and the peeling knife of the peeling device after peeling the fruit.

As cleaning fluid, air and/or water and/or cleaning liquid can be used, for example.

In an advantageous embodiment, the apparatus comprises a catching device for the catching of the core and/or the shell of the fruit, which can be arranged underneath the first and second processing device. For example, the catching device can be designed as a transport container. Thus, the core of the fruit can be separated from the shell of the fruit during the processing of the fruit and be disposed of separately or processed further. Preferably, the catching device has a suction device, by means of which the core of the fruit and/or the shell of the fruit can be sucked into the catching device.

BRIEF DESCRIPTION OF THE DRAWING FIGURES

The invention shall be explained more closely below with the aid of sample embodiments, which are shown schematically in the drawings.

FIG. 1 is a perspective representation of an apparatus according to the invention to hold a cucumber according to a first embodiment.

FIG. 2 is a front view of the centering device in the opened and closed state according to the first embodiment.

FIG. 3 is a view of the centering device and cutting device according to the invention for the removing of the end regions of the cucumber according to the first embodiment.

FIG. 4 is a view of the hollowing-out device for the removing of the core of the cucumber according to the first embodiment.

FIG. 5 is a view of the peeling device for the removing of the outer shell according to the first embodiment.

FIG. 6 is a view of the removing of the core piece by means of the hollowing-out device according to the first embodiment.

FIG. 7 is a view of the filling device for the introducing of a filling according to the first embodiment.

FIG. 8 is a view of the removing of the filled container from the peeling device according to the first embodiment.

FIG. 9 is a view of a vertical section through an edible container according to the invention with filling introduced into the interior cavity according to the first embodiment.

FIG. 11 is a magnified view of the cutting device for the cutting of a defined bottom in the cavity of the cucumber of FIG. 10.

FIG. 16 is a view of the fillable container produced by the processing of the cucumber by the apparatus according to the second embodiment.

DETAILED DESCRIPTION OF THE INVENTION

Figure 10:
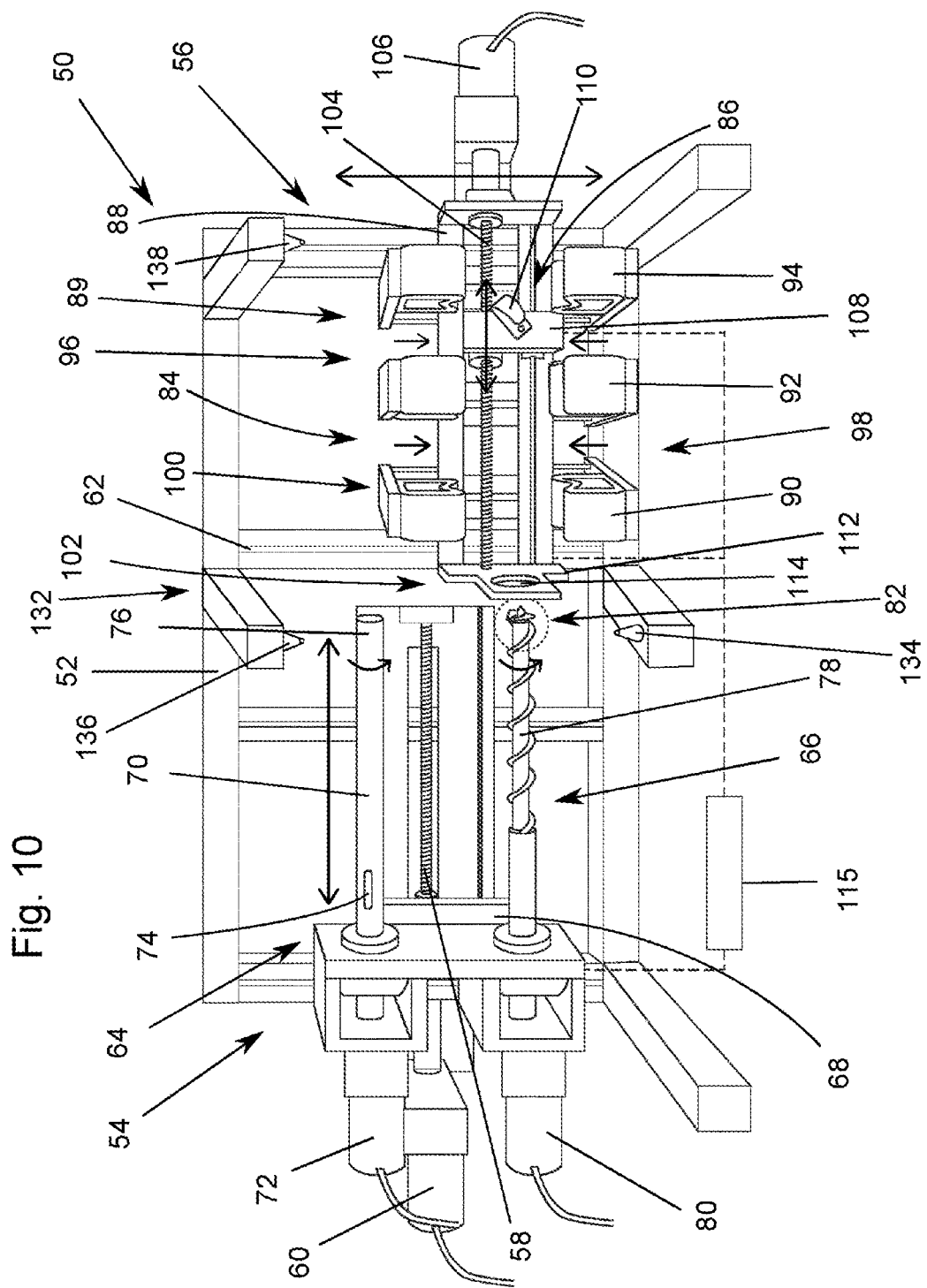
FIG. 10 is a perspective representation of an apparatus according to the invention to hold a cucumber according to a second embodiment.

FIG. 1 shows an apparatus 20 for producing a hollow cylindrical edible container from a cucumber 10 according to a first embodiment. The apparatus 20 comprises a centering device 11, a hollowing-out device 21 and a peeling device 26. The mentioned devices 11, 21 and 26 are secured on a base body 15, which comprises a longitudinal groove 16 to receive the devices 21 and 26. On the longitudinal groove 16 there are provided electrical contacts, not shown, which energize the devices 21 and 26 when they are inserted therein.

The centering device 11, as represented in FIG. 2a, comprises four centering shells 12a, 12b, 12c, 12d, which are secured on associated holders 13a, 13b, 13c, 13d which are staggered in the circumferential direction. The centering shells 12a, 12b, 12c, 12d are adjustable with respect to each other and lie in the closed state against the outside of the cucumber 10.

In the area of the centering device 11 there is arranged a cutting device 17, having a stand 18 which is secured to the base body 15. On the stand 18, two knives 19a, 19b are arranged and able to travel, serving to separate the end regions 10d, 10e of the cucumber 10. This shall be described in connection with FIG. 3.

The hollowing-out device 21 comprises a hollow knife 23, which is provided with a serration 23a at the end face. The hollow knife 23 is connected at the opposite end to a drive unit 24, in which an electric motor is provided for example. The activating of the drive unit 24 is done by a switch 25.

The hollowing-out device 21 serves to remove the core 10a of the cucumber 10. For this, the hollowing-out device 21 can travel relative to the centering device 11 in the longitudinal direction. Only a partial hollowing out occurs here, so that a closed bottom 10d of the cucumber 10 remains.

The peeling device 26, which can also be designed as a milling cutter, serves to remove the outer shell 10c of the cucumber 10. The peeling device 26 comprises a hollow knife 27, whose free end is provided with a serration 27a. The hollow knife 27 is connected to a drive unit 28, comprising an electric motor, not otherwise represented. The drive unit 28 can be activated by a switch 29. The peeling device 26 is secured by a foot 30 to the longitudinal groove 16 of the base body 15.

The peeling device 26 is able to travel relative to the centering device 11, in which the cucumber 10 is held. The outer shell of the cucumber 10 can be removed with the peeling device 26. At the same time, a uniform surface of the cucumber 10 is produced by the peeling of the outer shell.

A control device 14 controls an automatic feeding of the hollowing-out device 21, the peeling device 26 and a filling device 36.

The centering, slicing to length, and hollowing out of the cucumber 10 shall now be described with the aid of FIGS. 2, 3 and 4.

FIG. 2 shows the centering device 11 in a front view. Thanks to the centering device 11, the cucumber 10, which is often curved, is both centered and fixed.

In FIG. 2a, the centering shells 12a, 12b, 12c, 12d are opened. The curved cucumber 10 is placed in the centering device 11. FIG. 2b shows the centering device 11 in the closed state, in which the centering shells 12a, 12b, 12c, 12d lie against the outside of the cucumber 10, centering and straightening it. The centering of the cucumber 10 enables a hollowing out of the cucumber 10 and minimizes cutting scraps.

FIG. 3 shows the separating of the end regions 10d, 10e of the cucumber 10 by means of the cutting device 17. The knives 19a, 19b which are spaced apart on the cutting device 17 travel downward in the direction of the arrows, so that the end regions 10d, 10e of the cucumber 10 are separated.

The mode of functioning of the hollowing-out device 21 shall be explained with the aid of FIG. 4. It is evident from FIGS. 4a and 4b that the hollow knife 23 of the hollowing-out device 21 has a serration 23a and a cutting device 23b at its end face, being fashioned as a cutting wire. In place of a cutting wire 23b, a cutting mandrel can also be used. As is seen from the magnified view of FIG. 4b, the cutting wire 23b connects the free end regions of the serration 23a. The cutting device 23b serves to separate the core 10a from the bottom 10d of the cucumber 10.

As shown in FIG. 4c, the hollowing-out device 21 travels relative to the centering device 11, so that the hollow knife 23, placed in rotation by the drive unit 24, penetrates into the cucumber 10. The core 10a or a defined part of the inside of the cucumber 10 is hollowed out. FIG. 4d shows the end position. The cutting wire 23b serves to separate the core 10a from the bottom 10d after the hollowing out of the interior cavity.

The mode of functioning of the peeling device 26 shall be described with the help of FIG. 5. First of all, the centering device 11 is opened, so that the cucumber 10 held on the hollowing-out device 21 is exposed on its outside. The peeling device 26 is then brought up, wherein the hollow knife 27 removes the outer shell 10c of the cucumber 10. The mandrel 27b of the hollow knife 27 severs the outer shell 10c of the cucumber 10. FIG. 5c shows the end position in the retracted position of the peeling device 26.

FIG. 6 shows the removing of the core 10a from the cucumber 10 by means of the hollowing-out device 21. The core 10a, which lies on the hollow knife 23, is brought out along with it. The hollow cylindrical container 45 remains in place in the hollow knife 27 of the peeling device 26. For assistance, or alternatively, a pneumatic suction can also be provided.

FIG. 7 shows the filling device 36 provided for the apparatus 20 for the placing of a filling 37 in the interior cavity 41 of the cucumber 10. The filling device 36 comprises a carriage 40 to hold the filling 37. The carriage 40 is designed here as a half-shell. In addition, a covering shell, not shown, can be provided in order to press the filling 37 and adapt it to the interior cavity 41. The carriage 40 extends from a bearing block 38, which is secured by a foot 30 in the longitudinal groove 16 of the base body 15. Furthermore, a piston 39 is received on the bearing block 38, which can travel relative to the bearing block 38. For this, a drive unit for the piston 39 is provided in the bearing block 38. The outer diameter of the piston 39 is adapted to the inner diameter of the carriage 40 and fits inside the carriage 40.

FIG. 7a shows the filling device 36 in its starting position relative to the peeling device 26, on which the container 45 is held. In the position per FIG. 7b, the filling device is almost fully retracted into the container. In this position, the piston 39 is actuated in order to press in the filling. Finally, the filling device 36 is again moved out, while the filling 37 remains in the container.

FIG. 8 shows the discharging of the container 45 from the peeling device 26. A piston 43 is provided for this, being arranged and able to travel on the drive unit 28.

FIG. 9 shows the edible container 45 produced from the cucumber 10. The container 45 comprises an outer wall 10b, bounding off the interior cavity 41. The end region shown at the top in FIG. 9 is open. On the other hand, the end region shown at the bottom in FIG. 7 is closed by the bottom 10d.

The filling 37 is inserted in the interior cavity 41 of the container 45. The hollow cylindrical edible container 45 can be filled with various fillings 37. Besides meat fillings, especially chicken and beef, there can also be fish fillings, especially salmon and tuna. Furthermore, vegetarian fillings such as lettuce or rice can also be placed in the container 45.

Thus, one obtains an edible container 45 consisting of cucumber flesh, which can be filled with any desired filling 37.

FIG. 10 shows an apparatus 50 for producing a hollow cylindrical edible container according to a second embodiment. The apparatus 50 comprises a base body 52, a first processing device 54 and a second processing device 56.

The base body 52 comprises a horizontally arranged delivery spindle 58, which can be driven with the aid of an electric motor 60. Furthermore, the base body 52 comprises a delivery rail 62.

The first processing device 54 comprises a holding device 64, a hollowing-out device 66 and a delivery carriage 68, the holding device 64 and the hollowing-out device 66 being arranged firmly on the delivery carriage 68. The holding device 64 is arranged running parallel above the hollowing-out device 66.

The holding device 64 comprises a hollow tube 70, which can rotate about its own axis with the aid of an electric motor 72. On the outer wall of the hollow tube 70 there is provided a vent opening 74. The hollow tube 70 has a smooth surface 76.

The hollowing-out device 52 comprises a spiral drill 78, which can rotate about its own axis with the aid of an electric motor 80 and comprises a cutting device 82 at its end face.

The second processing device 56 comprises a centering device 84, a peeling device 86 and a delivery carriage 88, the centering device 84 and the peeling device 86 being arranged firmly on the delivery carriage 88.

The centering device 84 comprises three holding elements 90, 92, 94, which are arranged spaced apart from each other in the horizontal direction. The three holding elements 90, 92, 94 form a first holding jaw 96 and a second holding jaw 98 for the holding of a cucumber 10 to be processed. The first holding jaw 96 and the second holding jaw 98 can travel relative to each other. In addition, the holding elements 90, 92, 94 are outfitted with a pressure sensor 100.

The peeling device 86 comprises a stripping device 102, a delivery spindle 104, which can rotate about its own axis with the aid of an electric motor 106, and a delivery carriage 108 standing in engagement with the delivery spindle 104, on which a peeling knife 110 is arranged. The stripping device 102 comprises a stripping plate 112 and a through opening 114 located in the stripping plate 112. The diameter of the through opening 114 is both larger than the diameter of the spiral drill 78 and larger than the diameter of the hollow tube 70. The stripping device 102 is connected to the delivery spindle 104 at the left end of the delivery spindle 104 and makes a right angle with the delivery spindle 104.

The peeling device 86 is arranged on the delivery carriage 88 such that the stripping plate 112 runs parallel with the left side of the holding element 90 and the through opening 114 is vertically centered on the holding element 90 in the position of rest. The delivery spindle 104, the electric motor 106, the delivery carriage 108 and the peeling knife 110 are situated spatially behind the centering device 84.

Because the delivery carriage 68 of the first processing device 54 is in engagement with the delivery spindle 58 of the base body 52, the first processing device 54 is fastened so that it can move horizontally on the base body 52 by the propulsion of the electric motor 60 of the base body 52.

Furthermore, the delivery carriage 88 of the second processing device 56 is in engagement with the delivery rails 62 of the base body 52 so that the second processing device 56 is fastened on the base body 52 and can move vertically. In particular, the second processing device 56 can move from a centering position to a peeling position, while the hollowing-out position lies vertically beneath the peeling position.

When the first processing device 54 is arranged as far to the left as possible on the base body 52, the entire first processing device 54 is arranged horizontally to the left of the second processing device 56. If the first processing device 54 travels to the right, the horizontal arrangement of the first processing device 54 partly intersects the horizontal arrangement of the second processing device 56. For this, the spiral drill 78 can pass through the through opening 114 and extend vertically between the first holding jaw 96 and the second holding jaw 98 and the hollow tube 70 can extend above the second processing device 56 when the second processing device 56 is in the hollowing-out position.

If the second processing device 56 is in the peeling position, the hollow tube 70 can pass through the through opening 114 and extend vertically between the first holding jaw 96 and the second holding jaw 98. The spiral drill 78 can extend beneath the second processing device 56.

For an automated sequence, the control device 115 controls the horizontal travel of the first processing device 54, the vertical travel of the second processing device 56, the changes of position of the centering device 84 and the rotation of the spiral drill 78 and the hollow tube 70.

FIG. 11 shows an enlarged view of the end face of the spiral drill 78. The spiral drill 78 has a cutting device 82 at its end face for the cutting of a defined, e.g. planar, bottom 10d in the cavity of the cucumber, a drill tip 116 and a drill spindle 118 for transporting the core from the cucumber 10 to the outside. The cutting device 78 comprises a tip spindle 120 and a through opening 122. The tip spindle 120 forms a drilling blade 124 at the level of the drill tip 116, which removes the core to the full width of the diameter of the spiral drill 78 at the level of the drill tip 116. With the aid of the tip spindle 120, the core removed by the drilling blade 124 can be transported through the through opening 122 to the drill spindle 118, and thus out from the cucumber 10.

Figure 12A:
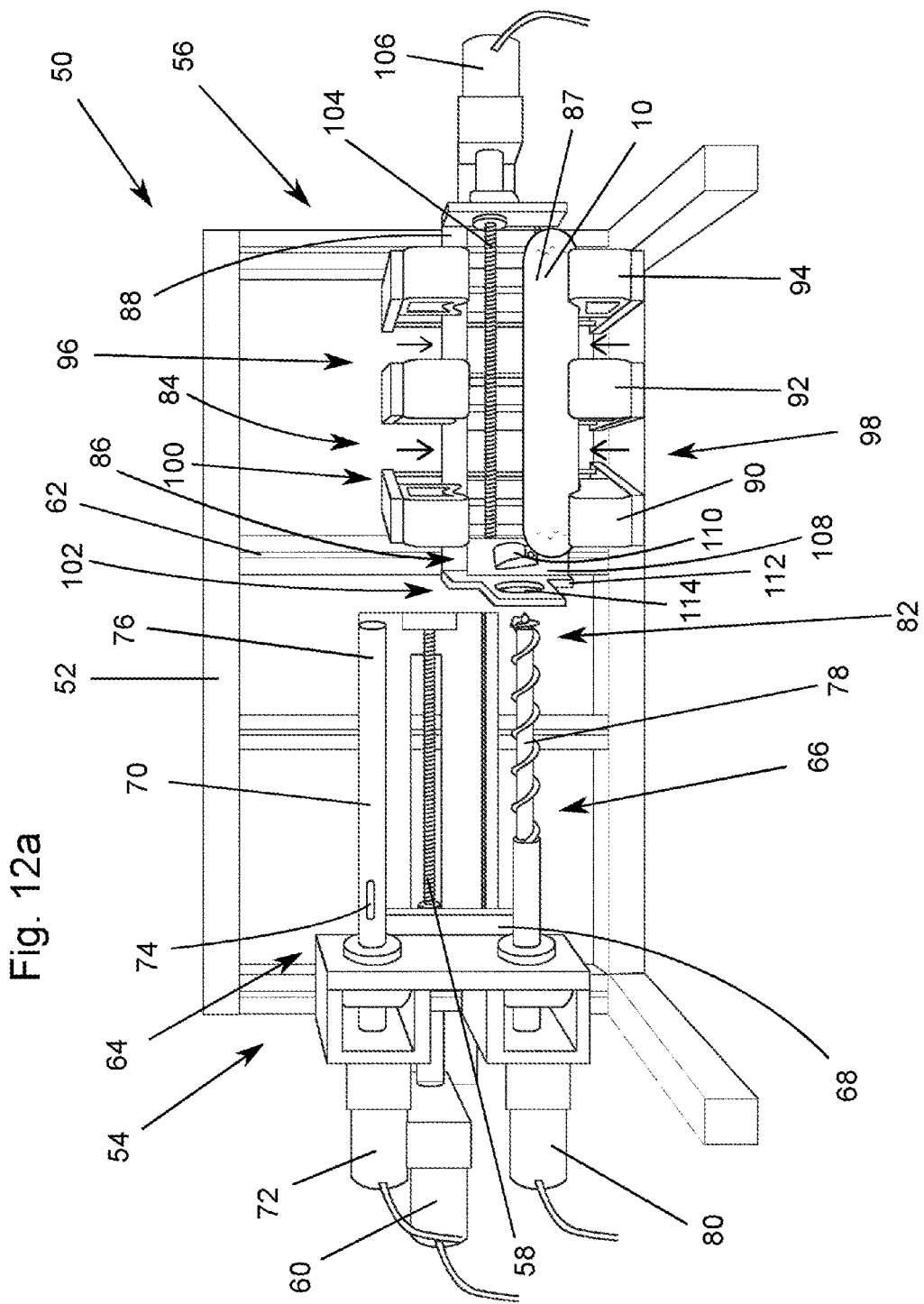
FIG. 12 is a view of the centering device in the position of rest and the centering position according to the second embodiment.

The method of functioning of the centering device 84 is described in FIG. 12. FIG. 12a shows the centering device 84 in the position of rest, the cucumber 10 having been inserted into the centering device 84. The cucumber 10 is arranged on the second holding jaw 98 such that the cucumber 10 makes contact with all three holding elements 90, 92, 94.

Figure 12B:
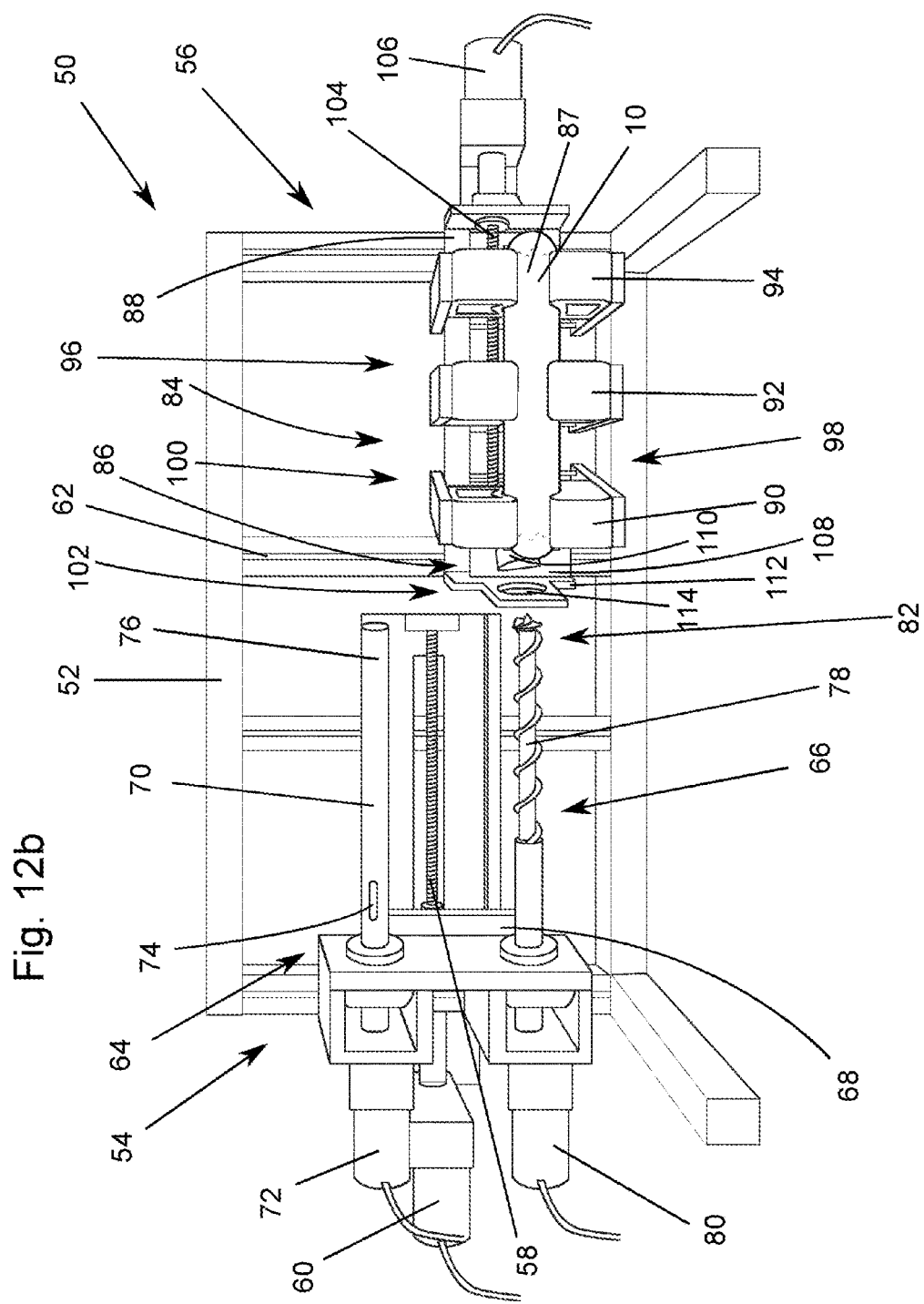

In order to fix and center the cucumber 10, the first holding jaw 96 and the second holding jaw 98 move toward each other and deliver the cucumber 10 to the same vertical level as the spiral drill 78. The centering and fixing of the cucumber 10 by the first holding jaw 96 and the second holding jaw 98 is shown in FIG. 12b. During the fixing of the cucumber 10, pressure sensors 100 ensure that the cucumber 10 remains structurally intact. Since the first holding jaw 96 and the second holding jaw 98 comprise a half-shell shape to receive the cucumber 10, curvatures of the cucumber 10 still need to be balanced out during the fixing. This balancing out takes place to such an extent that the pressure sensors 100 can ensure a structural integrity of the cucumber 10.

Figure 13A:
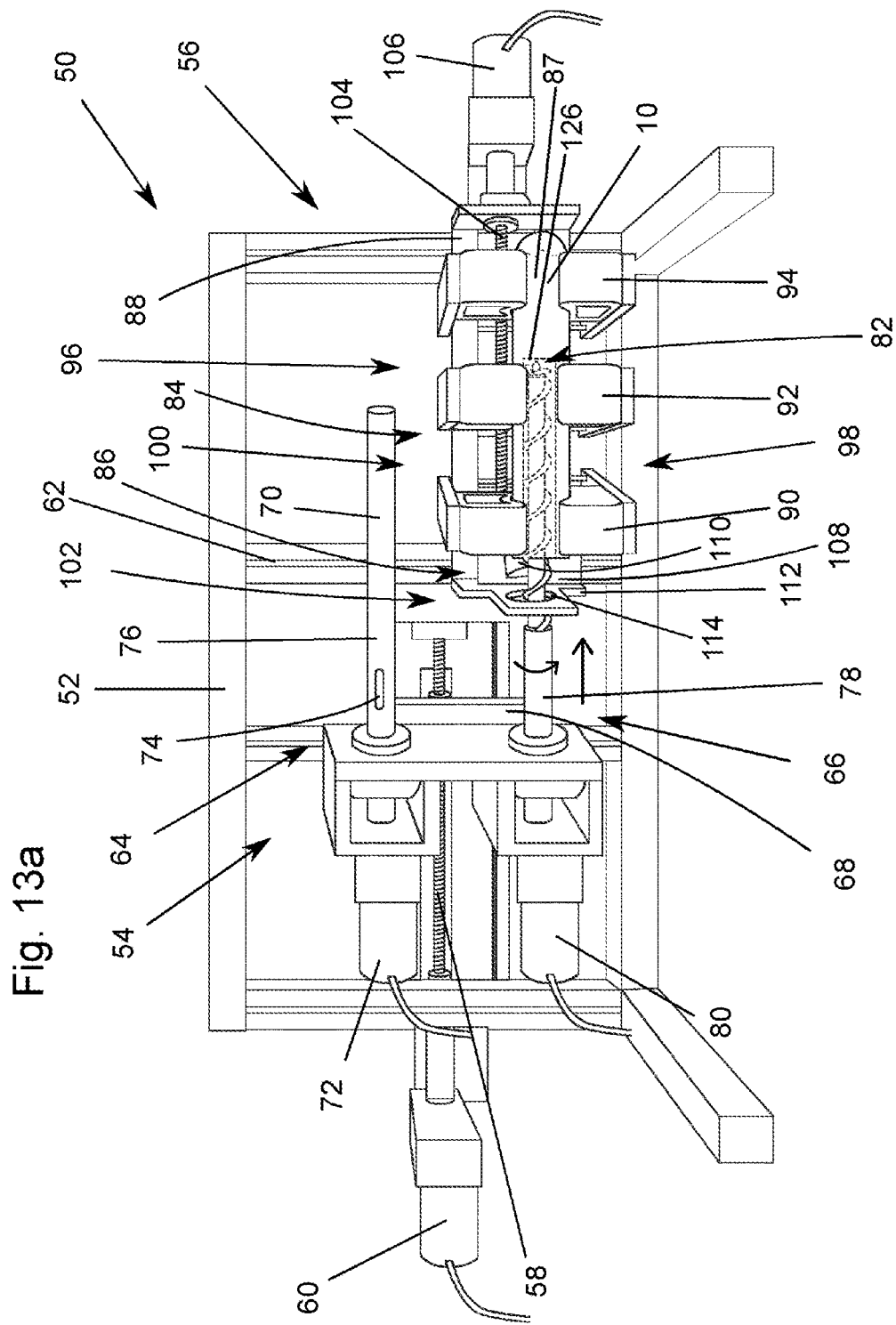
FIG. 13 is a view of the hollowing-out device for the removing of the core of the cucumber according to the second embodiment.

With the aid of FIG. 13 the method of functioning of the hollowing-out device 66 will be described. Thanks to the centering device 84, the cucumber 10 is fixed at the level of the end face of the spiral drill 78. The left end of the cucumber 10 has already been separated with a cutting device (not shown) to the left of the holding element 90. As can be seen in FIG. 13a, the electric motor 80 makes sure that the spiral drill 78 rotates in order to ensure a drilling operation. At the same time, the electric motor 60 makes sure that the delivery spindle 58 rotates and that the delivery carriage 68 standing in engagement with the delivery spindle 58 moves to the right with the hollowing-out device 66 secured thereon.

The spiral drill 78 thereupon moves through the through opening 114 of the stripping device 102 and into the cucumber 10. The spiral drill 78 bores out an interior cavity 126 in the cucumber 10. Thanks to the cutting device 82 at the end face of the spiral drill 78, a defined bottom 128 is bored out in the interior cavity 126 of the cucumber 10.

Inasmuch as the holding device 64, just like the hollowing-out device 66, is tied in to the movement of the delivery carriage 68, the holding device 64 also moves to the right during the hollowing out process. But since it is arranged vertically above the second processing device 56 during this step, the holding device 64 can travel horizontally above the second processing device 56 with no problems.

Figure 13B:
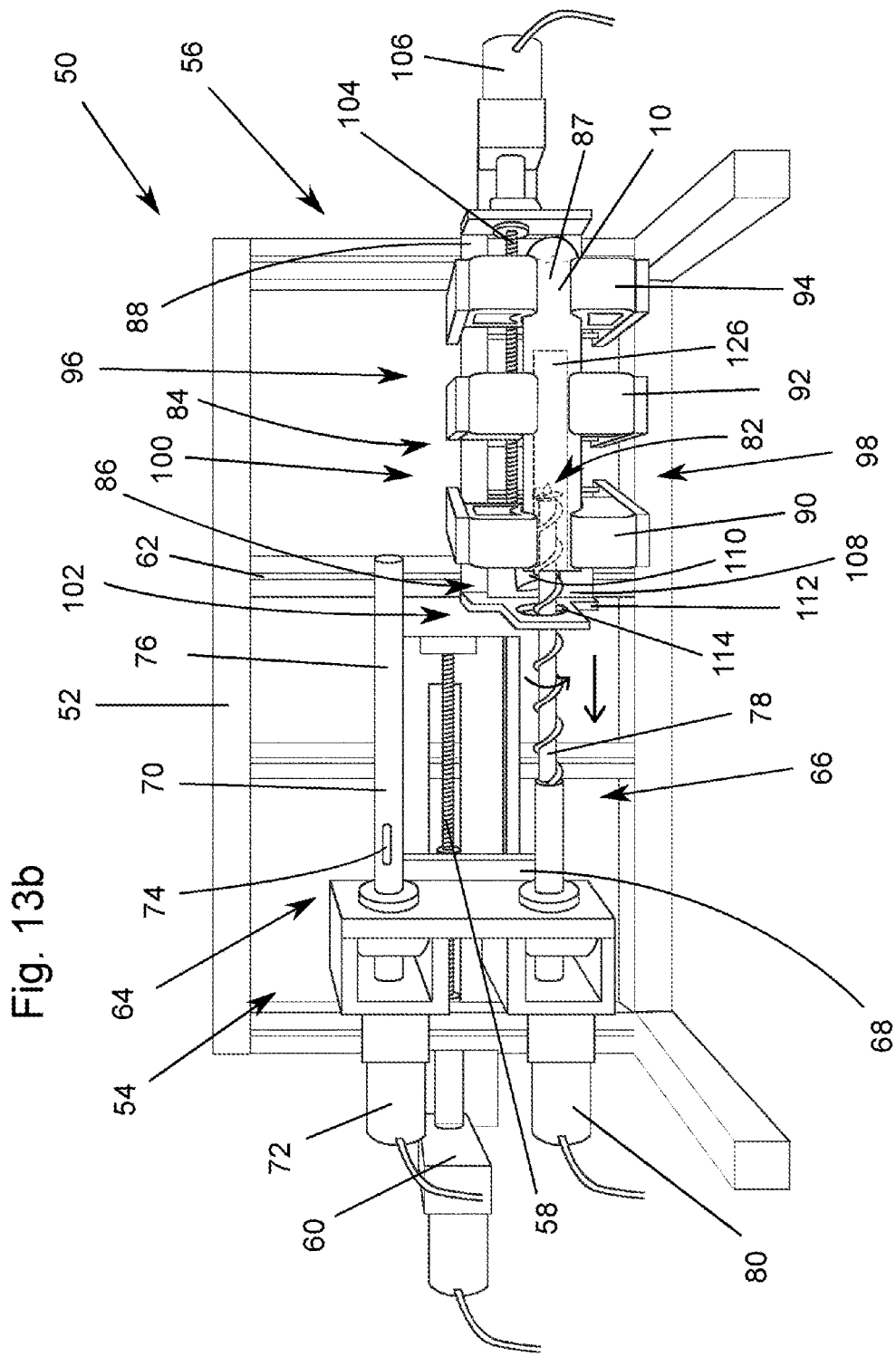

As can be seen in FIG. 13b, the spiral drill 78 returns back to its starting position after the boring out of the interior cavity 126 in the cucumber 10, indicated by a broken line.

Figure 14:
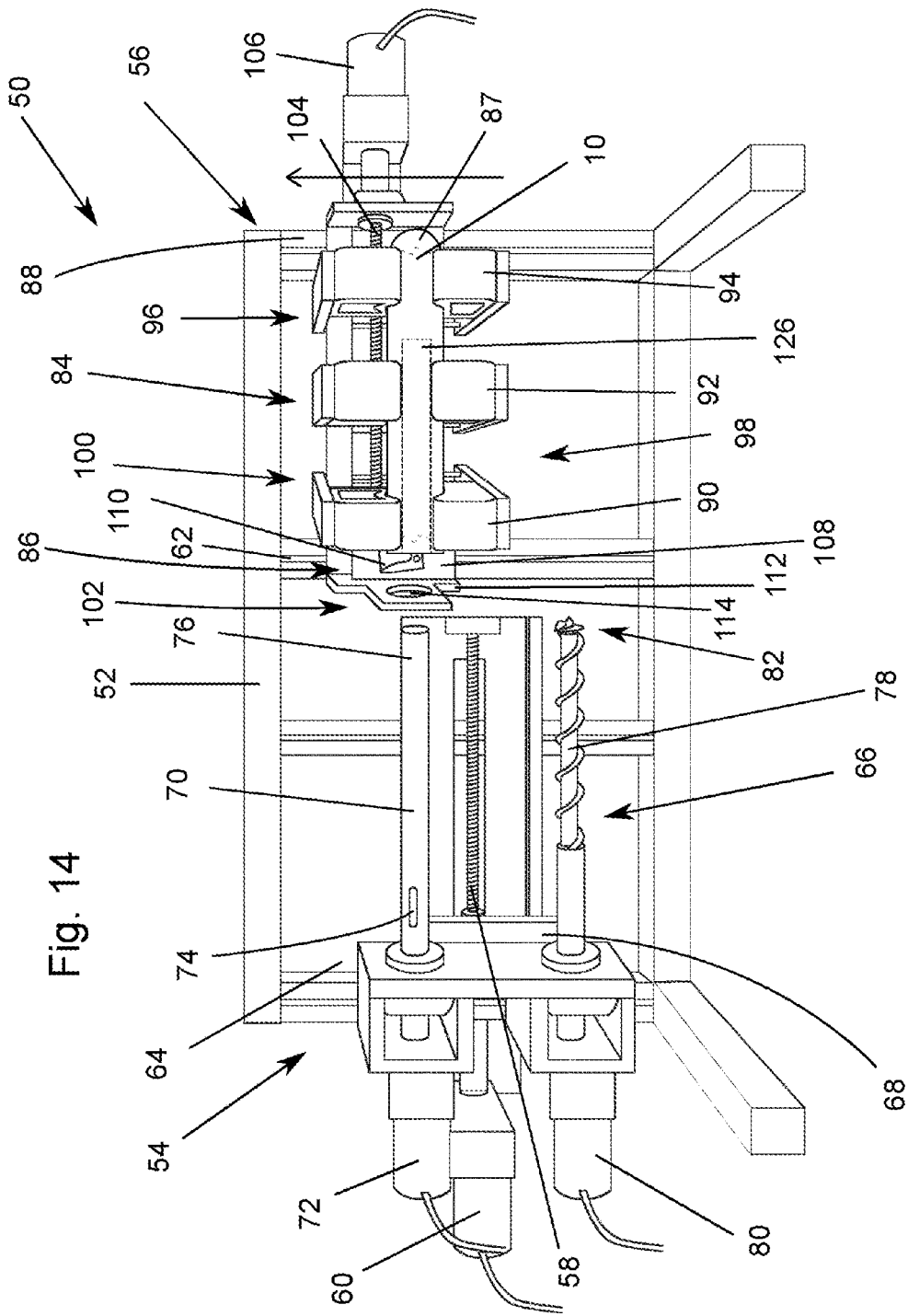
FIG. 14 is a view of the transport of the cucumber after the hollowing out to a position in which the cucumber will be peeled according to a second embodiment.

FIG. 14 shows the delivering of the second processing device from the hollowing out position to the peeling position. In the peeling position, the cucumber 10 is arranged horizontally at the same level as the hollow tube 70.

FIG. 15 shows the method of functioning of the peeling device 86. Since the cucumber 10 needs to be peeled, it must be removed from the centering device 84. The peeling knife 110 for peeling the cucumber 10 needs free access to the outer shell 87 of the cucumber 10. Furthermore, the right end of the cucumber has been sliced off at the position to the left of the holding element 94, in order to produce a bottom 130 of the cucumber 10 with a predetermined thickness.

Figure 15A:
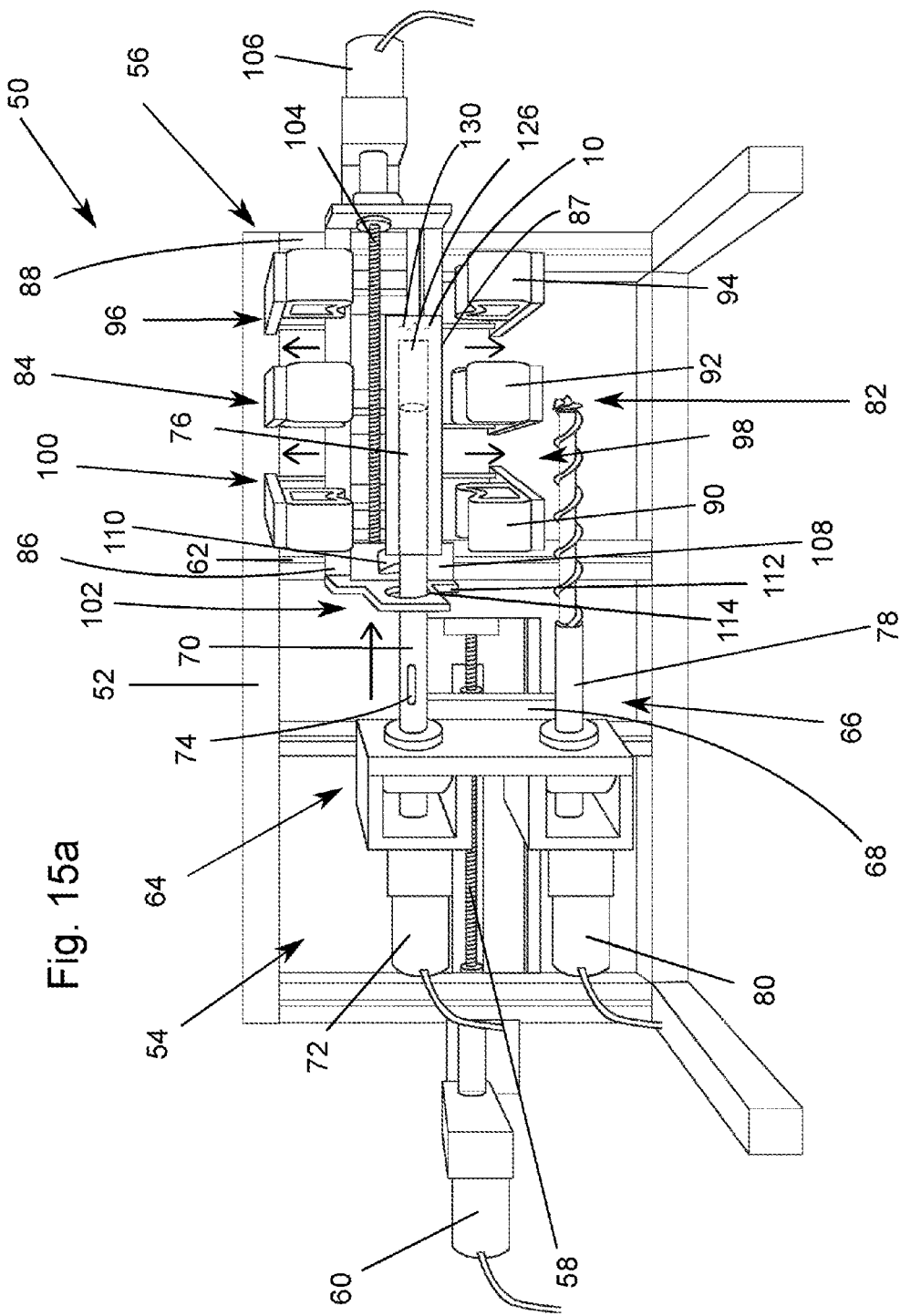
FIG. 15 is a view of the peeling device for the removing of the outer shell according to the second embodiment.

Therefore, the electric motor 60, as in the hollowing out process, actuates the delivery spindle 58 in order to move the first processing device 54 horizontally to the right. As can be seen in FIG. 15a, the hollow tube 70 passes through the through opening 114 of the stripping device 102 and into the interior cavity 126 of the cucumber 10. Once the hollow tube 70 has entered the cucumber 10 to the full length of the interior cavity 126, the centering device 84 switches from the centering position back to the position of rest and thus frees up the outer shell 87 of the cucumber 10.

Since the diameter of the hollow tube 70 corresponds roughly to the diameter of the interior cavity 126 of the cucumber 10, the hollowed-out cucumber 10 is fixed against a twisting of the cucumber 10 on the hollow tube 70 by a friction force which is produced between the surface of the hollow tube 70 and the moist surface of the interior cavity 126 of the cucumber 10.

Figure 15B:
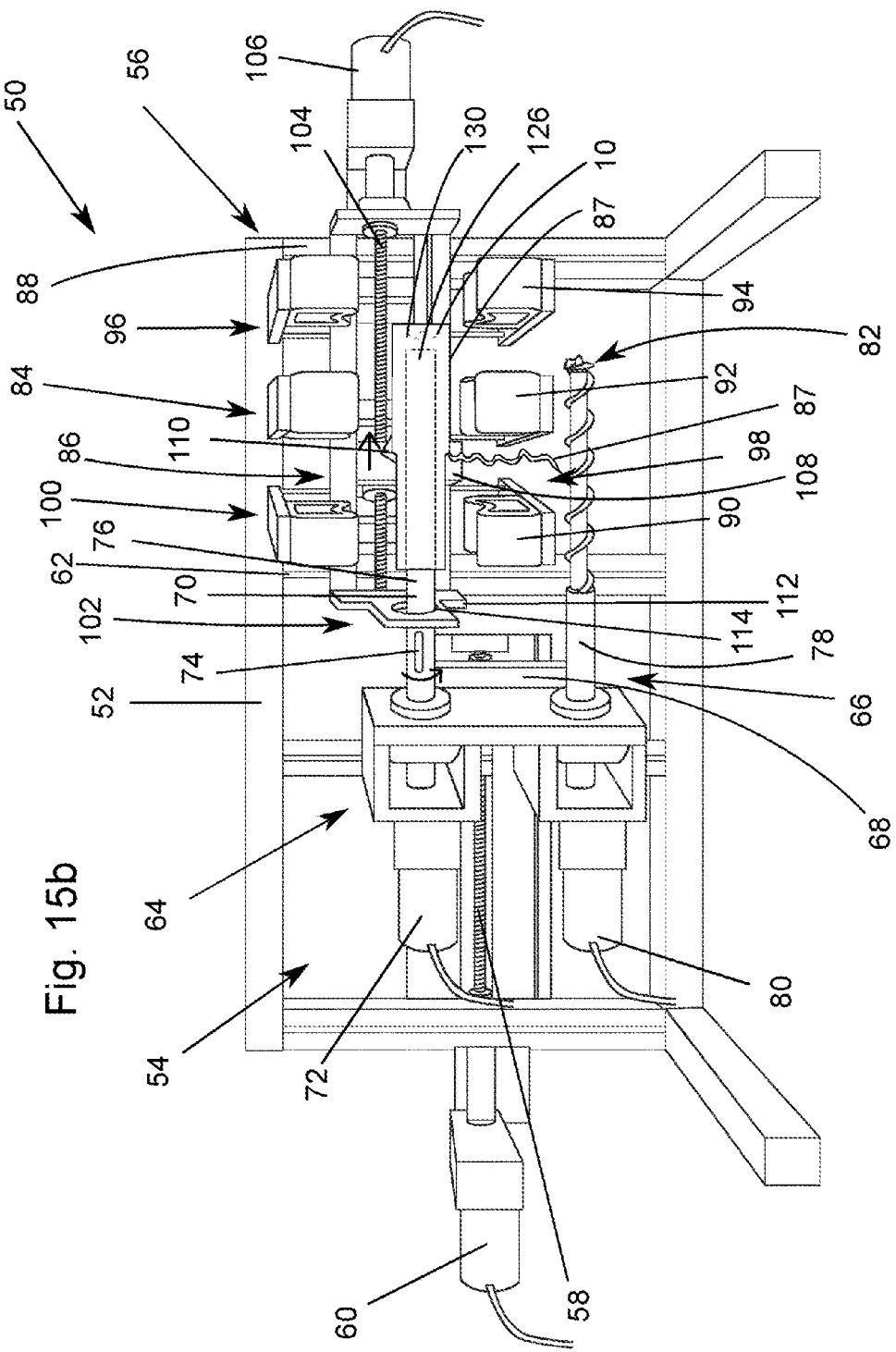

This effect is important since, as can be seen in FIG. 15b, the electric motor 72 begins to rotate the hollow tube 70 and at the same time the electric motor 106 begins to rotate the delivery spindle 104 in order to move the delivery carriage 108 with the peeling knife 110 arranged thereon to the right. Thus, the peeling knife 110 can remove the outer shell 87 of the cucumber 10. Accordingly, the friction force which prevents a twisting of the cucumber 10 on the hollow tube 70 must be greater than the countervailing force produced by the peeling of the peeling knife. For this reason, the hollow tube 70 has the smoothest possible, and thus the largest possible, surface 76. The larger the contact surface between hollow tube 70 and the surface of the interior cavity 126 of the cucumber 10, the greater the friction force which prevents a twisting of the cucumber 10 on the hollow tube 70.

Figure 15C:
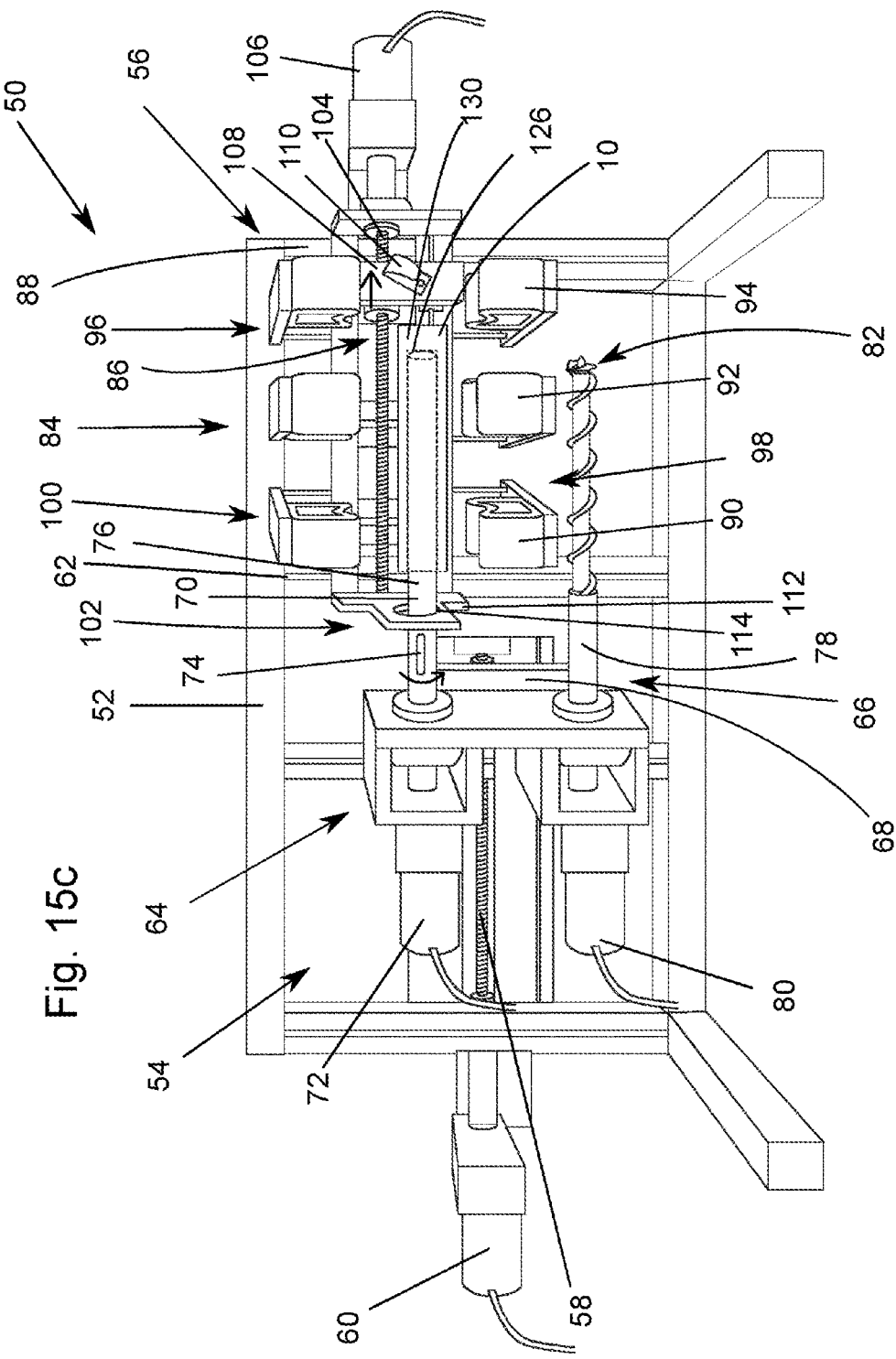
Figure 15D:
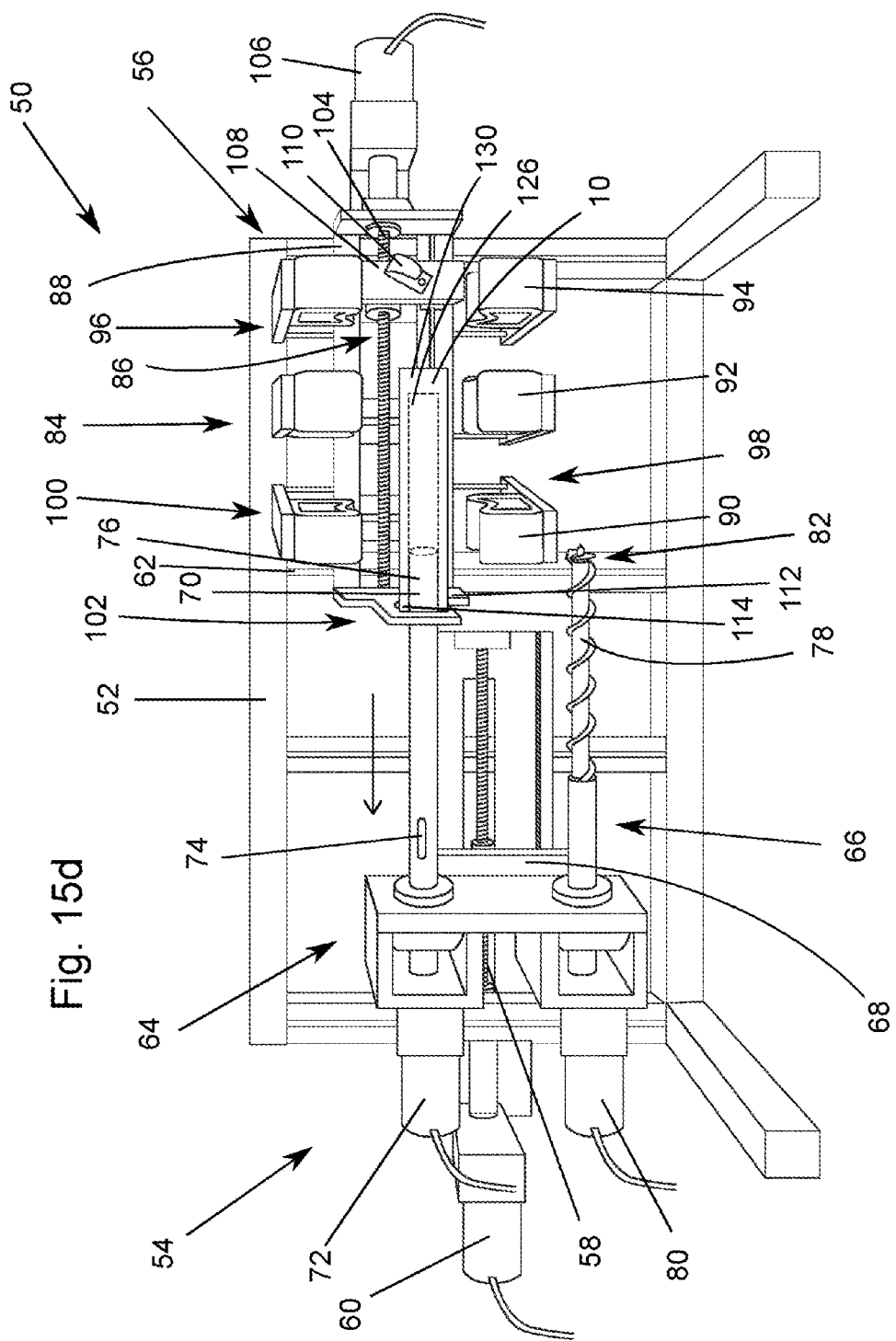

FIGS. 15c and 15d show the method after the peeling process. The peeling device 86 halts after the right end of the cucumber 10 and, as indicated in FIG. 15d, ends the rotation of the hollow tube 70. The hollowed-out and peeled cucumber now needs to be removed from the holding device 64. For this, as described above, the first processing device 52 is moved to the left and the hollow tube 70 exits once more from the through opening 114 of the stripping device 102. But the cucumber 10 located on the hollow tube 70 has a larger diameter than the through opening 114 of the stripping device 102. Therefore, the cucumber 10 is stripped off at the stripping plate 112 of the stripping device 102 by the movement of the first processing device 54 to the left and it can be removed from the apparatus 50.

The end product is a fillable container, as shown in FIG. 16, which can be made in a reproducible manner. The cucumber 10 is now peeled and sliced off at the ends, resulting in a cylindrical shape for the cucumber 10. Moreover, an interior cavity 128 has been produced, which makes the cucumber 10 fillable. Thanks to a special design of the hollowing-out device 66, the cucumber 10 comprises a defined bottom 130 in the interior cavity 128.

In addition, as shown in FIG. 11, a cleaning device 132 can be provided for the regular, automatic cleaning of the spiral drill 78 making contact with the cucumber 10, the hollow tube 70 and the peeling knife 110, which cleans the respective elements after their use with the aid of a fluid.

For this, the cleaning device 132 comprises a cleaning nozzle 134 for the cleaning of the spiral drill 78, in order to clean the spiral drill 78 upon emerging from the cucumber 10.

Moreover, the cleaning device 132 comprises a cleaning nozzle 136 for the cleaning of the hollow tube 70, in order to clean the hollow tube 70 upon emerging from the cucumber 10. Furthermore, the cleaning device 132 comprises a further cleaning nozzle inside the hollow tube 70 (not shown) in order to clean the hollow tube 70 from the inside, once it has been separated from the cucumber 10.

The cleaning device 132 comprises a cleaning nozzle 138 in order to clean the peeling knife 110 after the peeling of the cucumber 10.

The cleaning nozzle 134 is arranged on the base body 52 at the level of the cutting device 82 in the horizontal direction and beneath the first processing device 54 in the vertical direction.

The cleaning nozzle 136 is arranged on the base body 52 at the level of the cutting device 82 in the horizontal direction and above the first processing device 54 in the vertical direction.

The cleaning nozzle 138 is arranged on the base body 52 at the right end of the delivery spindle 104 in the horizontal direction and above the second processing device 56 in the vertical direction.

The cleaning device 132 preferably comprises a pump, which supplies fluid to all cleaning nozzles 134, 136, 138. Alternatively, the cleaning device 132 comprises several pumps in order to supply each cleaning nozzle separately with fluid.

List of Reference Numbers

| | |
|---|---|
| 10 | cucumber |
| 11 | centering device |
| 10a | core |
| 10b | outer wall |
| 10c | shell |
| 10d | bottom |
| 12a, b, c, d | centering shell |
| 13a, b, c, d | holder |
| 14 | control device |
| 15 | base body |
| 16 | longitudinal groove |
| 17 | cutting device |
| 18 | stand |
| 19 | knife |
| 20 | apparatus |
| 21 | hollowing-out device |
| 23 | hollow knife |
| 23a | serration |
| 23b | cutting device |
| 24 | drive unit |
| 25 | switch |
| 26 | peeling device |
| 27 | hollow knife |
| 27a | serration |
| 28 | drive unit |
| 29 | switch |
| 30 | foot |
| 36 | filling device |
| 37 | filling |
| 38 | bearing block |
| 39 | piston |
| 40 | carriage |
| 41 | interior cavity |
| 42 | arrow |
| 45 | container |
| 50 | apparatus |
| 52 | base body |
| 54 | first processing device |
| 56 | second processing device |
| 58 | delivery spindle |
| 60 | electric motor |
| 62 | delivery rails |
| 64 | holding device |
| 66 | hollowing-out device |
| 68 | delivery carriage |
| 70 | hollow tube |
| 72 | electric motor |
| 74 | vent opening |
| 76 | smooth surface |
| 78 | spiral drill |
| 80 | electric motor |
| 82 | cutting device |
| 84 | centering device |
| 87 | outer shell |
| 86 | peeling device |
| 88 | delivery carriage |
| 89 | holding unit |
| 90 | holding element |
| 92 | holding element |
| 94 | holding element |
| 96 | first holding jaw |
| 98 | second holding jaw |
| 100 | pressure sensor |
| 102 | stripping device |
| 104 | delivery spindle |
| 106 | electric motor |
| 108 | delivery carriage |
| 110 | peeling knife |
| 112 | stripping plate |
| 114 | through opening |
| 115 | control device |
| 116 | drill tip |
| 118 | drill spindle |
| 120 | tip spindle |
| 122 | through opening |
| 124 | drilling blade |
| 126 | container |
| 128 | interior cavity |
| 130 | bottom |
| 132 | cleaning device |
| 134 | cleaning nozzle |
| 136 | cleaning nozzle |
| 138 | cleaning nozzle |

The invention claimed is:

1. An apparatus for producing a hollow cylindrical edible container formed from a vegetable item or a fruit item, which container can be filled with a filling, the apparatus comprising:
   a) a centering device for the centering and fixing of one of the vegetable item and the fruit item;
   b) a hollowing-out device for the removing of a portion of a core of the one of the vegetable item and the fruit item -and forming an edible container having an interior cavity, wherein the hollowing-out device comprises a cutting device for cutting the interior cavity, the interior cavity defining a closed end region having a closed bottom, an outer peripheral wall extending from the closed bottom, and an open end region; and (ii) separating the portion of the core from the closed bottom and the outer peripheral wall of the one of the vegetable item and the fruit item; and
   c) a peeling device for the removing of at least a portion of an outer shell of the one of the vegetable item and the fruit item.

2. The apparatus of claim 1,
wherein the centering device and at least one of the hollowing-out device and the peeling device can travel relative to each other.

3. The apparatus of claim 1,
wherein at least one of the hollowing-out device and the peeling device comprise a hollow knife, which is coupled to a drive unit.

4. The apparatus of claim 1,
wherein the centering device comprises at least two centering shells enclosing the one of the vegetable item and the fruit item.

5. The apparatus of claim 1,
wherein a cutting device is provided for the separating of an end region of the one of the vegetable item and the fruit item.

6. The apparatus of claim 1,
wherein a filling device is provided for the placing of a filling in the interior cavity of the one of the vegetable item and the fruit item.

7. The apparatus of claim 6,
wherein the filling device comprises a carriage for holding the filling and a piston able to travel relative to it for the emptying of the carriage.

8. The apparatus of claim 1,
wherein a control device is provided, which controls an automatic feeding of at least one of the hollowing-out device, the peeling device and a filling device.

9. The apparatus of claim 1,
wherein a base body is provided with a longitudinal groove running in the longitudinal direction for introducing at least one of the centering device, the hollowing-out device, the peeling device, a filling device and a garnishing device.

10. The apparatus of claim 9,
wherein electrical contacts for at least one of the centering device, the hollowing-out device, the peeling device and a filling device are provided on the base body, especially at a longitudinal groove.

11. The apparatus of claim 1,
wherein the centering device comprises a holding unit.

12. The apparatus of claim 11,
wherein the holding unit comprises several holding elements, which are staggered in the longitudinal direction.

13. The apparatus of claim 12,
wherein the holding elements each form one first holding jaw and one second holding jaw, which can travel relative to each other.

14. The apparatus of claim 12,
wherein the holding elements are outfitted with a pressure sensor.

15. The apparatus of claim 1,
wherein the hollowing-out device further comprises an end face, and wherein the hollowing-out device is designed as a spiral drill, in which the cutting device for the cutting of the defined closed bottom of the one of the vegetable item and the fruit item is arranged at the end face.

16. The apparatus of claim 1,
wherein the device comprises a holding device for the fixing of the one of the vegetable item and the fruit item, the holding device configured to straighten the one of the vegetable item and the fruit item to balance out curvatures of the one of the vegetable item and the fruit item.

17. The apparatus of claim 16,
wherein the holding device comprises a hollow tube with a vent opening.

18. The apparatus of claim 17,
wherein the hollow tube comprises a smooth surface.

19. The apparatus of claim 1,
wherein the peeling device comprises a stripping device for the stripping of the one of the vegetable item and the fruit item off from the hollow tube.

20. The apparatus of claim 1,
wherein the peeling device comprises a horizontally movable peeling knife.

21. The apparatus of claim 19,
wherein the stripping device comprises a stripping plate with a through opening for the stripping of the one of the vegetable item and the fruit item off from the hollow tube.

22. The apparatus of claim 1,
wherein the centering device and the peeling device are fastened on the base body and are able to jointly travel vertically in order to switch from a centering position to a peeling position.

23. The apparatus of claim 1,
wherein the holding device and the hollowing-out device are fastened on the base body and are able to jointly travel horizontally.

24. The apparatus of claim 1,
wherein the device comprises a cleaning device for the cleaning at least one of the hollowing-out device, the peeling device and the holding device.

25. An apparatus for producing a hollow cylindrical edible container composed of one of a vegetable item or a fruit item which container can be filled with a filling comprising:
 a) a centering and straightening device comprising a holding unit for fixing of the one of the vegetable item and the fruit item, the holding unit having several holding elements which are staggered in a longitudinal direction along the one of the vegetable item and the fruit item, the holding unit configured to straighten the one of the vegetable item and the fruit item to balance out curvatures of the one of the vegetable item and the fruit item;
 b) a hollowing-out device for the removing a portion of a core of the one of the vegetable item and the fruit item and forming a cylindrical container having a peripheral outer wall having a closed end and an open end, the cylindrical container defining a longitudinal interior cavity, wherein the hollowing-out device comprises a cutting device for (i) cutting into the one of the vegetable item and the fruit item to form a defined closed bottom forming the closed end of the cylindrical container; and (ii) separating the core from the defined closed bottom of the one of the vegetable item and the fruit item, and c) a peeling device for the removing of an outer shell of the one of the vegetable item and the fruit item, wherein the cutting device is designed for the cutting of the defined closed bottom in the interior cavity of the one of the vegetable item and the fruit item.

* * * * *